(12) United States Patent
Lounibos et al.

(10) Patent No.: US 10,579,507 B1
(45) Date of Patent: Mar. 3, 2020

(54) DEVICE CLOUD PROVISIONING FOR FUNCTIONAL TESTING OF MOBILE APPLICATIONS

(71) Applicant: Akamai Technologies, Inc., Cambridge, MA (US)

(72) Inventors: Thomas M. Lounibos, San Francisco, CA (US); Matthew Solnit, San Jose, CA (US); Avinash Shenoy, San Francisco, CA (US); Karl Wardlaw Stewart, Morgan Hill, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 682 days.

(21) Appl. No.: 15/066,969

(22) Filed: Mar. 10, 2016

Related U.S. Application Data

(63) Continuation-in-part of application No. 13/435,976, filed on Mar. 30, 2012, now Pat. No. 9,990,110, which is a continuation-in-part of application No. 12/927,426, filed on Nov. 15, 2010, now Pat. No. 8,306,195, which is a continuation of application No.
(Continued)

(51) Int. Cl.
  *G06F 3/00* (2006.01)
  *G06F 11/36* (2006.01)
  *G06F 3/0484* (2013.01)
  *G06F 16/9535* (2019.01)

(52) U.S. Cl.
  CPC ...... *G06F 11/3664* (2013.01); *G06F 3/04842* (2013.01); *G06F 16/9535* (2019.01)

(58) Field of Classification Search
  CPC .. G06F 19/00; G06F 11/3688; G06F 11/3672; G06F 8/65; G06F 3/0482; G06F 19/321; G06F 19/3418; G06F 17/30578; G06F 19/3481; G06F 21/44; G06F 21/577; G06F 21/6245; G06F 2213/0038; G06F 8/34; G06F 9/44505; G06F 11/2221; G06F 11/3003; G06F 11/302; G06F 11/3093; G06F 11/34; G06F 11/3419; G06F 11/3466; G06F 11/3476; G06F 11/36; G06F 11/3636; G06F 11/3668; G06F 11/3684
  See application file for complete search history.

(56) References Cited

U.S. PATENT DOCUMENTS 5,600,789 A   2/1997   Parker et al.
5,615,347 A   3/1997   Davis et al.
(Continued)

OTHER PUBLICATIONS

U.S. Appl. No. 14/172,045, filed Feb. 4, 2014 available in IFW.
(Continued)

*Primary Examiner* — Di Xiao

(57) ABSTRACT

A computer-implemented method for automatically provisioning a device grid for use in cloud-based functional testing of an application includes providing a graphical user interface (GUI) that allows a user to input search criteria specifying a set of different device characteristics. A search is then performed across one or more device cloud providers to locate available physical devices that match at least one of the device characteristics. The available physical devices are displayed on the GUI. Responsive to selection input of the user, a number of each selected physical device for the device grid are reserved. An application program to test is then loaded on each reserved physical device.

26 Claims, 19 Drawing Sheets

Related U.S. Application Data

11/503,580, filed on Aug. 14, 2006, now Pat. No. 7,844,036.

(56) References Cited

U.S. PATENT DOCUMENTS

| | | |
|---|---|---|
| 5,724,525 A | 3/1998 | Beyers et al. |
| 5,945,986 A | 8/1999 | Bargar et al. |
| 6,025,853 A | 2/2000 | Baldwin |
| 6,092,043 A | 7/2000 | Squires et al. |
| 6,134,582 A | 10/2000 | Kennedy |
| 6,317,786 B1 | 11/2001 | Yamane et al. |
| 6,477,483 B1 | 11/2002 | Scarlat et al. |
| 6,542,163 B2 | 4/2003 | Gorbet et al. |
| 6,560,564 B2 | 5/2003 | Scarlat et al. |
| 6,601,020 B1 | 7/2003 | Myers |
| 6,738,933 B2 | 5/2004 | Fraenkel et al. |
| 6,792,393 B1 | 9/2004 | Farel et al. |
| 6,817,010 B2 | 11/2004 | Aizenbud-Reshef et al. |
| 6,898,556 B2 | 5/2005 | Smocha et al. |
| 6,959,013 B1 | 10/2005 | Muller et al. |
| 7,133,805 B1 | 11/2006 | Dankenbring et al. |
| 7,334,162 B1 | 2/2008 | Vakrat et al. |
| 7,464,121 B2 | 12/2008 | Barcia et al. |
| 7,548,875 B2 | 6/2009 | Mikkelsen et al. |
| 7,587,638 B2 | 9/2009 | Shah et al. |
| 7,607,169 B1 | 10/2009 | Njemanze et al. |
| 7,617,201 B1 | 11/2009 | Bedell et al. |
| 7,630,862 B2 | 12/2009 | Glas et al. |
| 7,653,721 B1 | 1/2010 | Romanov et al. |
| 7,685,234 B2 | 3/2010 | Gottfried |
| 7,693,947 B2 | 4/2010 | Judge et al. |
| 7,725,812 B1 | 5/2010 | Balkus et al. |
| 7,757,175 B2 | 7/2010 | Miller |
| 7,844,036 B2 | 11/2010 | Gardner et al. |
| 8,015,327 B1 | 9/2011 | Zahavi et al. |
| 8,060,581 B2 | 11/2011 | Day et al. |
| 8,166,458 B2 | 4/2012 | Li et al. |
| 8,306,195 B2 | 11/2012 | Gardner et al. |
| 8,341,462 B2 | 12/2012 | Broda et al. |
| 8,510,600 B2 | 8/2013 | Gardner et al. |
| 8,762,374 B1 * | 6/2014 | Chen ................. G06F 17/30864 707/733 |
| 9,015,654 B2 | 4/2015 | Kaasila et al. |
| 9,021,362 B2 | 4/2015 | Broda et al. |
| 9,026,661 B2 | 5/2015 | Swildens et al. |
| 9,154,611 B1 | 10/2015 | Jackson et al. |
| 9,229,842 B2 | 1/2016 | Broda et al. |
| 9,251,035 B1 | 2/2016 | Vazac et al. |
| 9,384,121 B2 | 7/2016 | Jackson et al. |
| 9,450,834 B2 | 8/2016 | Gardner et al. |
| 9,436,579 B2 | 9/2016 | Hemmert et al. |
| 9,495,473 B2 | 11/2016 | Gardner et al. |
| 9,491,248 B2 | 12/2016 | Broda et al. |
| 9,720,569 B2 | 7/2017 | Gardner et al. |
| 9,772,923 B2 | 9/2017 | Tellis et al. |
| 9,785,533 B2 | 10/2017 | Vazac et al. |
| 9,882,793 B2 | 1/2018 | Broda et al. |
| 9,942,105 B2 | 3/2018 | Gardner et al. |
| D820,297 S | 6/2018 | Gardner |
| 9,990,110 B1 | 6/2018 | Lounibos et al. |
| 10,037,393 B1 | 7/2018 | Polovick et al. |
| 10,067,850 B2 | 9/2018 | Vazac et al. |
| D832,283 S | 10/2018 | Tellis |
| 10,114,915 B2 | 10/2018 | Polovick et al. |
| 10,177,999 B2 | 12/2019 | Broda et al. |
| 2002/0147937 A1 | 10/2002 | Wolf |
| 2003/0074161 A1 | 4/2003 | Smocha et al. |
| 2003/0074606 A1 | 4/2003 | Boker |
| 2003/0109951 A1 | 6/2003 | Hsiung et al. |
| 2004/0039550 A1 | 2/2004 | Myers |
| 2004/0059544 A1 | 3/2004 | Smocha et al. |
| 2004/0123320 A1 | 6/2004 | Daily et al. |
| 2005/0216234 A1 | 9/2005 | Glas et al. |
| 2006/0190806 A1 | 8/2006 | Sasson et al. |
| 2007/0299631 A1 | 12/2007 | Macbeth et al. |
| 2008/0066009 A1 | 3/2008 | Gardner et al. |
| 2008/0140347 A1 | 6/2008 | Ramsey et al. |
| 2009/0210890 A1 | 8/2009 | Tully |
| 2010/0315945 A1 * | 12/2010 | Matuszewski ...... H04L 43/0817 370/221 |
| 2011/0066892 A1 | 3/2011 | Gardner et al. |
| 2011/0096108 A1 | 12/2011 | Agrawal et al. |
| 2012/0017165 A1 | 1/2012 | Gardner et al. |
| 2012/0166634 A1 | 6/2012 | Baumback et al. |
| 2012/0246310 A1 | 9/2012 | Broda et al. |
| 2012/0324101 A1 | 12/2012 | Pecjack et al. |
| 2013/0019242 A1 * | 1/2013 | Chen .................... H04L 41/145 718/1 |
| 2013/0097307 A1 | 4/2013 | Vazac et al. |
| 2013/0116976 A1 | 5/2013 | Kanemasa et al. |
| 2013/0166634 A1 | 6/2013 | Holland |
| 2013/0205020 A1 | 8/2013 | Broda et al. |
| 2013/0346839 A1 * | 12/2013 | Dinha ................... G06F 9/5072 715/205 |
| 2014/0033055 A1 | 1/2014 | Gardner et al. |
| 2014/0189320 A1 | 7/2014 | Kuo |
| 2014/0280880 A1 | 9/2014 | Tellis et al. |
| 2015/0067527 A1 | 3/2015 | Gardner et al. |
| 2015/0304920 A1 * | 10/2015 | Cootey ................ H04W 28/18 455/436 |
| 2015/0319071 A1 | 11/2015 | Kaasila et al. |
| 2016/0044520 A1 * | 2/2016 | Iyer ...................... H04W 24/08 370/252 |
| 2017/0034722 A1 * | 2/2017 | Antarkar .............. H04W 24/08 |

OTHER PUBLICATIONS

U.S. Appl. No. 14/668,928, filed Mar. 25, 2015 available in IFW.
U.S. Appl. No. 14/688,245, filed Apr. 16, 2015 available in IFW.
U.S. Appl. No. 15/066,969, filed Mar. 10, 2016 available in IFW.
U.S. Appl. No. 15/155,185, filed May 16, 2016 available in IFW.
U.S. Appl. No. 15/441,718, filed Feb. 24, 2017 available in IFW.
U.S. Appl. No. 15/449,061, filed Mar. 3, 2017 available in IFW.
U.S. Appl. No. 15/591,353 filed May 10, 2017 available in IFW.
U.S. Appl. No. 15/668,002 filed Aug. 3, 2017 available in IFW.
U.S. Appl. No. 15/862,503 filed Jan. 4, 2018, available in IFW.
U.S. Appl. No. 15/968,984 filed May 2, 2018, available in IFW.
U.S. Appl. No. 15/709,928 filed Sep. 20, 2017, available in IFW.
U.S. Appl. No. 15/448,954 filed May 8, 2019, available in IFW.
Non-final Office Action for U.S. Appl. No. 15/968,984 dated Jun. 21, 2019, 46 pages.

\* cited by examiner

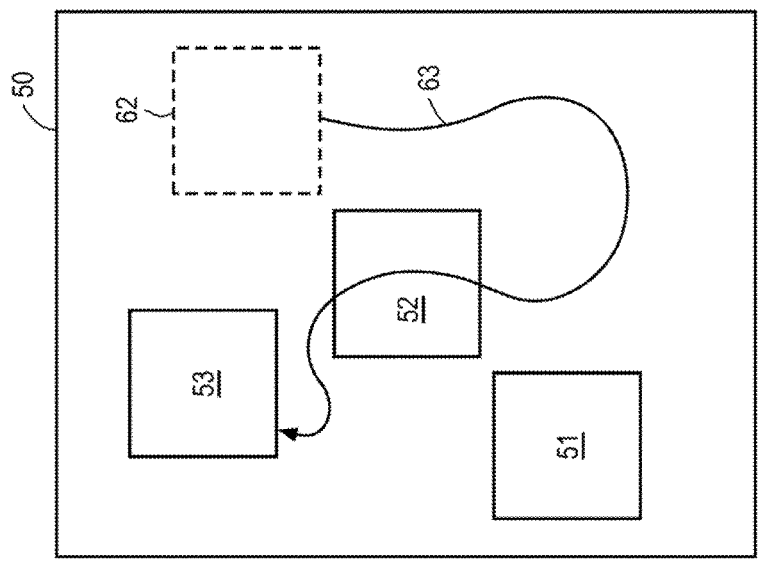
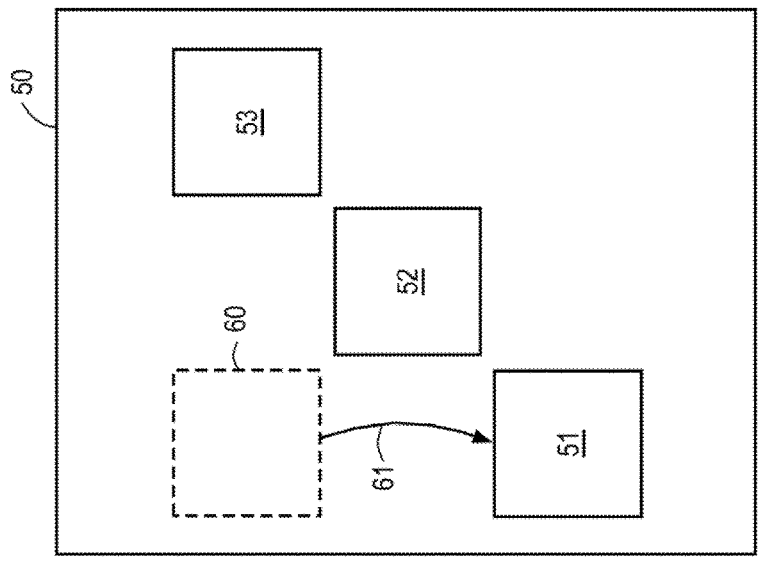

DEVICE CLOUD PROVISIONING FOR FUNCTIONAL TESTING OF MOBILE APPLICATIONS

RELATED APPLICATIONS

This application is a continuation-in-part (CIP) application of Ser. No. 13/435,976 filed Mar. 30, 2012, which application is a CIP application of Ser. No. 12/927,426 filed Nov. 15, 2010, now U.S. Pat. No. 8,306,195, which is incorporated by reference herein in its entirety, and which application is a continuation of Ser. No. 11/503,580 filed Aug. 14, 2006, now U.S. Pat. No. 7,844,036. Each of the aforementioned applications is assigned to the assignee of the present CIP application.

TECHNICAL FIELD

The present disclosure relates generally to the fields of cloud computing and grid computing; more particularly, to automated systems and methods for functional testing of mobile applications on wireless mobile devices that employ a touch-sensitive, gesture-based user interface.

BACKGROUND

In recent years there has been a huge proliferation of the number of applications (also referred to as "apps") developed for devices such as smartphones, tablets and other wireless mobile computing devices. For example, there are literally hundreds of thousands of mobile applications available in the marketplace for use on hundreds of millions of iOS (iPad, iPhone, etc.) and Android mobile platform devices. On a typical day it is estimated that upwards of 1,000 new apps are created for mobile computing devices. Testing of these mobile applications across different platforms, hardware modules, and software/firmware versions is a huge challenge. By way of example, for a developer to test all the permutations of a mobile application on all the possible variations of hardware (e.g., phone or tablet) modules, for all operating system (OS) versions, and across all vendor firmware versions, such a task could easily result in a thousand or more test case combinations. Thus, the explosion of mobile computing devices and apps for use on these devices is creating a strain on testing organizations.

Adding to the difficulty of functional testing of mobile applications is the evolving voice, touch, movement and gesture-based (e.g., swipe, pinch, zoom, flip, etc.) user interfaces that today's mobile applications rely upon. A plethora of challenges exist, such as how to precisely test different gestures, geolocation, motion, etc., as well as how to realistically conduct load, functional and performance tests on a variety of different mobile devices. For mobile developers, reconciling touch and gesture-based input with design and functionality goals in mobile applications has become a daunting problem. Testing gestures in a mobile application is extremely time consuming and difficult. Companies typically employ a team of engineers to manually test all of the features and functionality of the application on a given platform, or set of in-house, physical devices. Due in part to the slow, arduous, labor-intensive, and error-prone process required for manual functional testing of mobile applications, it is estimated that more than half of all mobile and Web apps are publically released without ever being functionally or scale tested.

Past attempts at functional test automation of mobile applications have typically relied upon the practice of "jailbreaking" the mobile device. Jailbreaking is the unauthorized process of breaking through the locked environment and removing the limitations imposed by manufacturers such as Apple@ on devices (i.e., iPhone, iPod touch, iPad) which run the iOS operating system through use of custom kernels. Jailbreaking allows users to gain root access to the operating system, allowing iOS users to download additional applications, extensions, and themes that are unavailable through the official Apple App Store. Jailbreaking is necessary if the user intends to run software not authorized by Apple. Additionally, many prior art testing techniques require that the mobile device be tethered. Tethering refers to the practice wherein the jail broken mobile device is connected via a wire or cable to a hardware component (i.e., a computer) capable of utilizing optical recognition algorithms to read pixels and thus identify the objects (e.g., icons, text, buttons, elements, etc.) displayed on the screen. Optical recognition techniques for functional testing of mobile applications, however, are known to be fragile and brittle. For instance, optical recognition techniques are prone to producing false negative test results following minor software revisions, such as from a change in the position or location of button on the screen.

Some companies offer online tools and consoles to developers that allow them to run applications and tests on an emulator system or platform that simulates an actual mobile device. For instance, Google offers an online simulator product called Android Studio for Android application developers. The problem with these tools is that the user is essentially running a fake device on their laptop computer that lacks the complete functionality of an actual physical device.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIGS. 5A-5F illustrate an example sequence of screenshots showing manipulation of objects via gesture-based user input during a capture phase of functional test automation for a mobile application.

DETAILED DESCRIPTION

Figure 1:
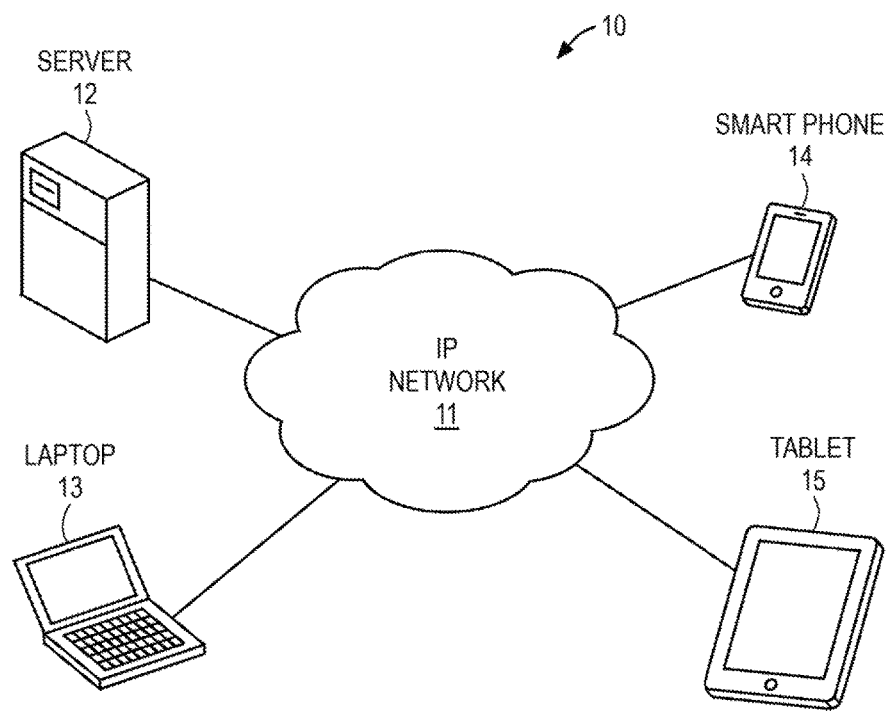
FIG. 1 is an example high level architectural diagram of a cloud computing platform providing functional test automation for mobile applications.

In the following description specific details are set forth, such as mobile device types, operating systems, cloud providers, gesture commands, functions, tasks, etc., in order to provide a thorough understanding of the subject matter disclosed herein. However, persons having ordinary skill in the relevant arts will appreciate that these specific details may not be needed to practice the present invention. It should also be understood that the elements in the FIGs. are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure. Cloud computing is closely related to grid computing, which refers to the concept of interconnecting networked computers such that processing power, memory and data storage are all community resources that authorized users can utilize for specific tasks.

A device grid refers to a set of physical devices having specific characteristics, the devices being allocated automatically by one or computers configured to execute functional wireless mobile test routines (e.g., test compositions) on those devices.

A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

A public device cloud is specific to vendors that provide public access to a wide variety of wireless mobile devices on an on-demand, pay-as-you-go basis. For example, companies such as Amazon®, Testdroid of Helsinki, Finland, Perfecto of Woburn, Mass. and NTTR of Tokyo, Japan allow customers access to mobile devices for application testing.

A "private cloud" is a cloud that is not generally available to the public, and which is typically located behind a firewall of a business. Thus, a private cloud is infrastructure operated solely for a single organization or business. A private cloud may be hosted and/or managed internally by the business, or externally by a third-party. In the present disclosure, a "private device cloud" refers to a private cloud or network associated with a single organization or business built with devices inside their own data centers or remote office locations. Alternatively, the devices may be provided externally by a third-party host. A private device cloud may thus comprise a wide variety of real devices, including wireless mobile computing devices, located throughout the world. A private device cloud may also denote a pre-selected set of dedicated cloud-based devices reserved for an individual customer use at any particular time.

The term "server" broadly refers to any combination of hardware or software embodied in a computer (i.e., a machine instance) designed to provide services to client devices or processes. A server therefore can refer to a computer that runs a server operating system from computer-executable code stored in a memory, and which is provided to the user as a virtualized or non-virtualized machine; it can also refer to any software or dedicated hardware capable of providing computing services.

A "message" generally refers to a unit of data that can be sent via an electronics communications network, e.g., the Internet, to another computational or communications system or device, e.g., to a server. By way of example, a message could represent a communication sent to a queuing system, a REST call, or a Hypertext Transfer Protocol (HTTP) request. A message could also be instantiated entirely or partially as a single operation, such as a web service call in any one of a variety of forms, e.g., XML, JMS, HTML, JSON, etc. A "message clip" (or "clip" for short) comprises a set of one or more messages that includes a specification of the location, timing and/or dependencies of objects or elements specified within that set of messages. A clip typically comprises a plurality (e.g., hundreds or thousands) of sequenced messages that form part of a larger load test composition.

In the context of the present disclosure, a "mobile computing device" or "mobile device" (for short) refers to any one of a number of different portable electronic devices having a touch-sensitive display with a graphical user interface (GUI), one or more processors, memory and one or more modules, programs or sets of instructions for performing methods associated with the operations described herein. A mobile computing device typically runs on an operating system executed on one or more processors, and may also run one or more applications installed or resident in memory (e.g., firmware, RAM, EEPROM, etc.) In some embodiments, the mobile computing device may provide a plurality of functions including wireless communication, thereby allowing a user of the mobile device access data and information via connection to the Internet. Mobile computing devices include smartphones, tablet computers, wearable computers, ultra-mobile PCs, personal digital assistants, other hand-held devices, as well as other mobile appliances and computers (e.g., carputers) that have touch screen interfaces with wireless communication capabilities.

A mobile application, also known as an application program or mobile app, is a term used to describe a software or firmware program that runs on a mobile computing device.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly instantaneously, i.e., within a few seconds, hundreds of milliseconds, or less.

In one embodiment, a cloud-based testing platform is provided that delivers complete functional test automation for gesture-based mobile applications. The cloud-based testing platform includes an executable program or computer program product that provides precision capture and playback of all continuous touch gestures including pan, pinch, zoom, and scroll on iPhones, iPads, iPods, Android and other types of mobile devices. Touch-based GUI testing is conducted from inside the mobile app, thereby enabling validations based on variable values and internal mobile application state changes. In one embodiment, mobile computing devices are controlled remotely via IP addressing over a wireless network during capture and playback of gesture-based command inputs comprising the functional test of the mobile app. Persons of skill in the art will appreciate that this approach obviates the need for tethering, rooting, or jailbreaking the mobile device.

In another embodiment, an automated multi-cloud device grid provisioning feature is provided for functional mobile testing of mobile applications running on real physical devices. The multi-cloud device grid provides easy access to a wide variety of devices from different vendors offering public and private device cloud services, as well as the customer's own devices. A browser application running a GUI offers the user or customer with the ability to provision devices on-demand and automatically shut them down when testing is completed. All aspects of the provisioning process are automated, including parallel threads for different clouds, automatically detecting and recovering from bad devices, etc. For instance, in one embodiment, a user is able to specify a test case and grid definition, click "Auto-Deploy-Run" and the system executes all of the device grid provisioning, functional mobile device testing and automatic release of the devices across a plurality of device clouds.

In one embodiment, a system comprises a plurality of mobile computing devices provisioned from public and private clouds, as well as a private network associated with an enterprise. The mobile computing devices each have a touch-sensitive display screen operable to receive gesture-based user input during running of a mobile application. The mobile computing devices may be geographically distributed across a plurality of different regions, states or countries. The mobile computing devices connect with one or more servers over HTTP or Hypertext Transfer Protocol Secure (HTTPS). One or more computers run a program for playback of a test composition comprising a timed sequence of clips on the mobile computing devices running the mobile application. The timed sequence of clips includes one or more actions, each of which instructs a precise gesture-based action applied to at least one object displayed on the touch-sensitive display screen. The precise gesture-based action corresponds to a functional aspect of the mobile application and comprising a plurality of data elements previously captured from inside the mobile application while the mobile application was subject to the gesture-based user input entered via the touch-sensitive display screen.

In another embodiment, the cloud-based platform enables precision functional test automation for mobile applications and mobile devices having next-generation (or mixed-generation) user interfaces, including continuous, multi-touch gestures, voice, kinetics, bendable device, hovering, 3D movement, and 3D navigation/animation browser user interfaces. In a specific embodiment, a functional testing program captures the start and end points of each gesture command input via a touch-sensitive display of a mobile device. In addition, the exact journey of the gesture between the start and end points, including the precise coordinates of the path taken by the user's finger(s), and the temporal variations in the speed with which a particular gesture is performed. In contrast to brittle optical recognition approaches, the method, system and computer program product of the disclosed invention uniquely captures each GUI gesture from within the mobile app (i.e., via code), thereby enabling validations based on variable values and internal mobile app state changes.

FIG. 1 is an example high level architectural diagram of a system 10 for functional test automation of mobile applications. In the embodiment shown, system 10 includes a server 12 connected via a cloud 11 with a laptop computer 13, a smartphone 14 and a tablet 15. Cloud 11 may comprise an Internet Protocol (IP) network, such as the general public Internet, or an intranet private computer network confined to an organization that uses IP technology or a combination of private and public networks. Although FIG. 1 show only one smartphone 14 and tablet 15 each, other embodiments may utilize a plurality of mobile computing devices (e.g., smartphones and/or tablets) for functional testing of a mobile app. In still other embodiments, only a single mobile computing device may be connected with servers 12 and laptop 13 during functional testing of a mobile app installed on the mobile device. Similarly, server 12 shown in FIG. 1 may comprise a single server (as shown) or a plurality of servers, either located at a single center or distributed across different geographical locations.

In the embodiment shown, the cloud-based testing platform, which comprises executable program for capture and playback of a sequence of gesture-based inputs used to functionally test a mobile application on a particular mobile computing device, is deployed on server 12. Server 12 communicates with laptop 13 via a browser application running on laptop 12. In one implementation, the functional testing program running on server 12 operates to create a graphical user interface (GUI) that allows a user of laptop 13 to remotely interact with the testing program. In this way, a user of laptop computer 13 may orchestrate the capture and playback of gesture-based commands as part of a functional test of a target mobile app running on a specific mobile computing device. (The term "target" as used herein refers to a mobile application in combination with a mobile computing device.) Via laptop 13 a user may also compose a test composition comprising a collection of recorded clips obtained from the capture of one or more inputs obtained from one or more mobile devices. In other words, gesture-based inputs or commands may be captured from different devices, or from the same device taken at different times and under different conditions and collected in a database or library associated with server 12. These captured inputs, stored in the form of message clips, may be arranged in a temporally-sequenced composition for playback on a mobile device in an automated manner as part of functional testing of the mobile device.

It is appreciated that in other implementations, laptop computer 13 may comprise a desktop computer, workstation, or other computing device that provides a graphical user interface that allows a user to capture and playback of a sequence of gesture-based inputs used to functionally test a mobile application on a mobile computing device, remotely execute a composition of previously recorded clips on the mobile device from anywhere around the world, as well as analyze/review results of the test in real-time. The GUI may be web-based so it can be accessed from any computer having web-browser capabilities from any location in the world, without installation of specialized software.

Persons of skill in the art will understand that the software which implements the cloud-based functional testing platform may also be downloaded to the user's laptop computer 13 or implemented on a separate hardware appliance unit located either at the user's premises (e.g., behind the firewall) or anywhere in cloud 11. It is further appreciated that laptop 13 is representative of a wide variety of computer devices, such as workstations, personal computers, distributed computer systems, etc., that may be utilized by the user to execute the methods, processes, and testing steps described herein.

Figure 2:
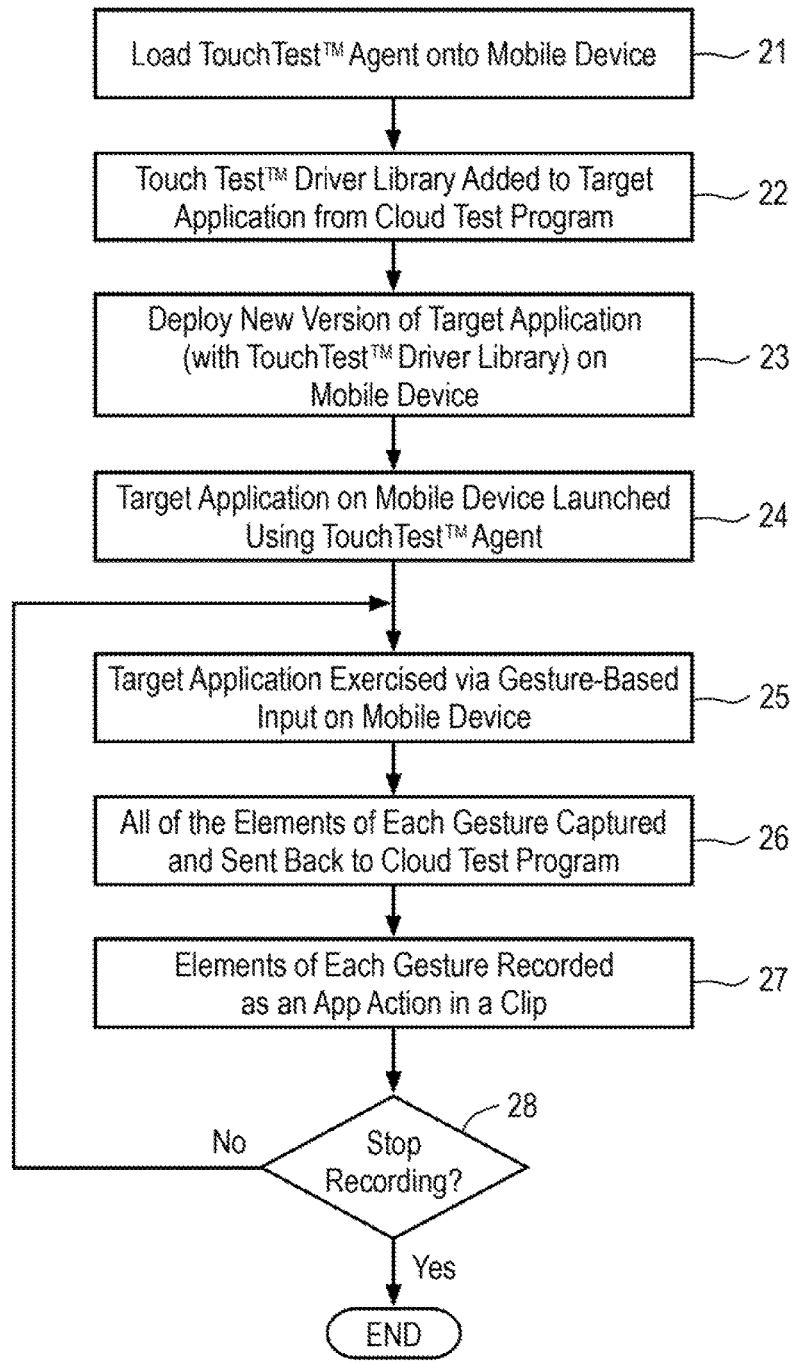
FIG. 2 is an example flow diagram of a sequence of steps for precision capture of gesture-based user input on a mobile computing device.

FIG. 2 is an example flow diagram of a sequence of steps for precision capture and recording of continuous touch, gesture-based user input (as well as text or other types of input) to a mobile app running on a mobile computing device. Once a user logs into the testing program running on server 12 (e.g., via laptop computer 13), he or she may generate a new test clip by capturing gesture-based input (e.g., tap, swipe, pinch, zoom, rotate, etc.) for a mobile app that is running on a remote mobile device. The initial step in the process is the loading of a TouchTest™ device agent (or TouchTest agent for short) onto the mobile device to be tested (block 21). The TouchTest agent is a Web page that the user navigates to (e.g., in mobile Safari, or any other mobile web browser) which enables the remote launching of the particular mobile application that the user wishes to test on that mobile device. The TouchTest agent may be customized for the specific hardware/software/firmware platform on which it is intended to run. In one embodiment, the TouchTest agent is a web application that the user may browse to via laptop 13.

It should be understood that the TouchTest agent itself is not the mobile application to be tested; rather, it is a web application program that is used to launch the particular mobile application to be tested. The TouchTest agent thus provides a wireless connection to an automated test integration system, wherein functional testing can be performed continuously over an extended time period without anybody actually physically being there to launch and terminate the mobile app. Note that a user need only enter the information required for login once (as shown in field 42 of FIG. 4), i.e., when the TouchTest agent is first launched.

Continuing with the example of FIG. 2, the next step in the process is the addition of a TouchTest Driver component library to the target mobile application (block 22). In one embodiment the library is added to the application via a script that the user runs. Note that the script may typically create another deployment target in the mobile app project utilized specifically for functional test purposes (e.g., not the actual mobile application sold via an app store). That is, in the embodiment shown, the next step is the deployment of a new version of the target mobile app (with the TouchTest Driver library) on the mobile device (block 23). In another embodiment, the mobile application developer may compile the library into the application to enable functional testing. The TouchTest Driver component library enables, from within the application code itself, the observation and tracking of every element that is displayed on the screen of the mobile device.

Persons of skill in the art will understand that the approach described herein does not involve the use of optical recognition algorithms. That is, because the TouchTest Driver component library is inside the application it is possible to introspect the object model of the mobile application and then identify via code every element that appears on the screen. This information may then be transmitted (wirelessly) to the remote server running the cloud-based functional testing program. For instance, when a click on the button or icon occurs, that object may be identified wherever it is located on the screen page and observed changing (state, position, etc.). The TouchTest Driver component library thus provides the ability to record with very high precision what happens to objects on the screen as a result of gesture-based user input during interaction with the mobile application. For example, when a user makes a change to an object on the touch-screen via a multi-touch input (e.g., zoom command) the functional test program records the exact gesture and changes that happen to that object with the same precision as takes places via the user input. Later, the recorded gesture may be played back remotely by the program such that the object reacts as if the operating system running on the mobile device invoked it via direct manual user interaction with the touch-screen.

This approach of recording gesture-based inputs by natively using the mobile application allows for manual testing of the target while precisely recording all functional test gestures input to a mobile computing device. The user interface of the functional testing program also allows a user to create a test composition using recorded clips, as well as playback of the composition on the remotely located mobile device using advanced test automation features. For instance, the user may add delays into the automated test, or perform conditional testing wherein the test waits for or responds to certain changes to objects on the screen. In other words, the user can validate that a particular object has a particular state—whether the state of a button, icon, image, etc.—with extremely high accuracy and without the errors common to past approaches that rely upon optical recognition techniques. Very complex test cases may therefore be created for automated testing of remote targets.

Once the testing component, TouchTest Driver, library has been added to the target mobile application, the target mobile application may be launched remotely via the GUI of a user's laptop or other computer using the TouchTest agent (block 24). With the target running the application, inputs may be made in any manner (gesture event, motion event, click event, typing event, etc.) to exercise any and all features of the application (block 25). Each gesture (or other input) that is invoked directly on an object on the screen is immediately captured with precision and transmitted wirelessly back to the cloud testing platform, e.g., server or other computer running the functional test program (block 26). The elements of each input, which include the position coordinates and temporal speed or velocity (rotational and directional, if applicable) at which gestures or changes are made to each object, are then recorded as an app action in a clip (block 27). App actions are clip elements just like HTTP messages, SOAP messages, delays, etc. Note that the clip elements which contain the precision elements of a gesture-based input are referred to as app action clip elements. The process of capturing all gesture-based user inputs with precision, sending the captured information back to the server, and recording of the information in a message clip (stored in memory) continues until the user elects to stop the recording (block 28).

Figure 3:
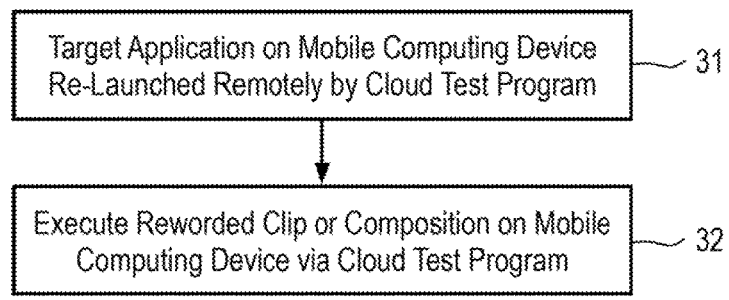
FIG. 3 is an example flow diagram of a sequence of steps for playback of previously-captured gesture-based user input on a mobile computing device.

FIG. 3 is an example flow diagram of a sequence of steps for playback of previously-captured gesture-based user input on a mobile computing device. After recording one or more clips that includes gesture-based or other types of user inputs to a mobile application, a composition editor GUI of the functional test program may be utilized to create a test composition. By way of example, the test composition may comprise a sequence of clips that are laid out on parallel tracks for execution on the target mobile device. To initiate the playback process, the target application on the mobile computing device is re-launched by the remote testing program (or other remote computer) via the device agent (block 31). The recorded clip or test composition may then be executed by the user, e.g., clicking on a "playback" button (block 32). It is appreciated that each test clip plays out on the target mobile device exactly as it was originally recorded (assuming no alterations or changes made via a clip or composition editor). Test performance, including statistics and other test metrics, may be displayed in real-time on an analytic dashboard. It is appreciated that playback of a recorded clip occurs at exactly the same precision (temporal speed, sequence timing, coordinate locations, etc.) at the time the gesture (regardless of the number of finger touches involved or number of objects effected) or other input was captured and recorded.

When a given test is over, another test may be launched via the device agent as part of a continuous test integration framework. In addition, persons of skill in the art will appreciate that the cloud testing platform described herein makes it possible to functionally test multiple devices located at different geographical locations simultaneously. For instance, a test composition may comprise a plurality of tracks, with each track including test clips set to play on a different device. By way of example, certain mobile applications may be developed to run universally on iPad, iPhone and iPod Touch devices. A test composition may be created which includes different tracks, each track including test clips to play on a different device running the same mobile app. The playback may occur simultaneously and wirelessly on each of the devices without jailbreaking, tethering, emulation, simulation, or the need to have the mobile devices geographically co-located.

It should be further understood that playback is not limited to actions of a single object affected by a user's input. Playback of a test composition may include simultaneous actions of a multitude of objects, such as in the case of a multi-player game having different characters and changing backgrounds. In some cases, multiple objects may all be simultaneously affected by inputs not just resulting from a user's finger movements across a touch-sensitive screen, but also from accelerometers, gyroscopes, compass and GPS coordinate inputs. All of this information is precisely captured and available for precision playback as part of functional test automation. Note that this is not limited to what actions are performed on just one object—it also includes actions simultaneously performed on a multitude of objects. For example, the mobile application may comprise a game where there are multi-players, and where each of the different players make gesture-based inputs on a variety of different objects.

After the user of the target has stopped exercising the mobile device, the recorded clip is then saved to a memory (e.g., RAM, EPROM, EEPROM, magnetic disk, etc.) associated with the remote server. Thereafter, a user of the cloud-based testing platform may play the clip back exactly as it was recorded, edit the clip via an editor UI to change elements or otherwise create a new test composition.

Figure 4:
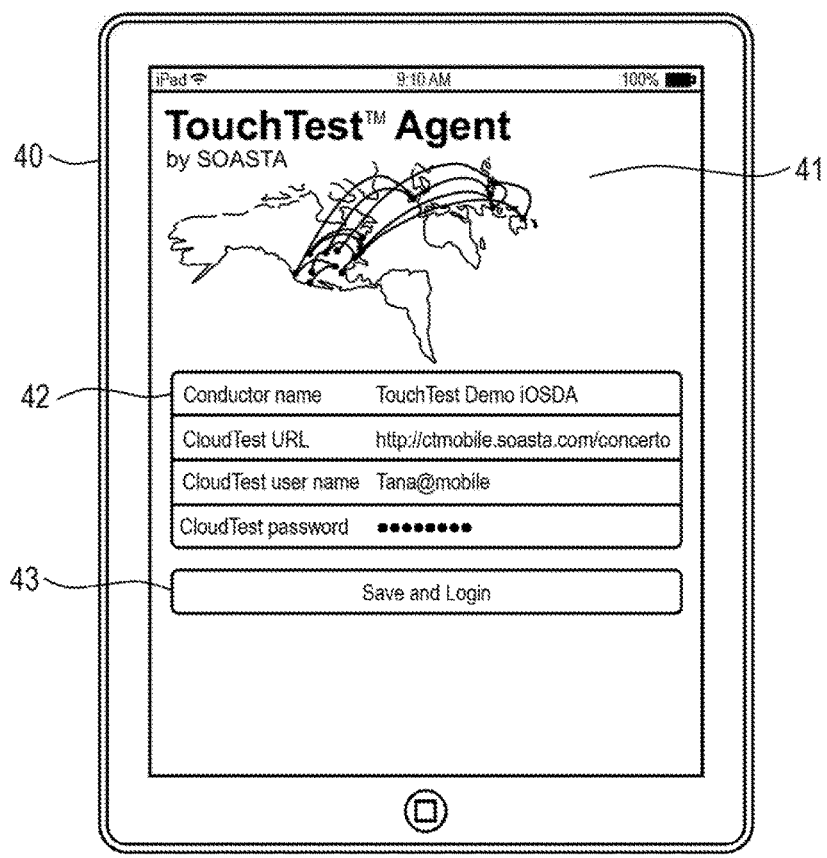
FIG. 4 illustrates an example mobile computing device running an iOS device agent program.

FIG. 4 illustrates an example mobile computing device 40 (e.g., Tana's iPad) running an iOS device agent program (TouchTest Agent), which is shown appearing as screenshot 41 on mobile device 40. As can be seen, screenshot 41 includes a field 42 listing the Device Agent name (i.e., TouchTest Demo iOSDA), the Uniform Resource Locator (URL) address of the server running the cloud-based testing program (i.e., http://ctmobile.soasta.com/concerto), the username (i.e., Tana@mobile), and the user's password (hidden). A Save and Login button 43 is also shown. During the capture and recording phase of functional testing, the mobile application (mobile app) under test may be launched via a message sent to the TouchTest agent from a remote computer (e.g., laptop 13 of FIG. 1).

Figure 5B:
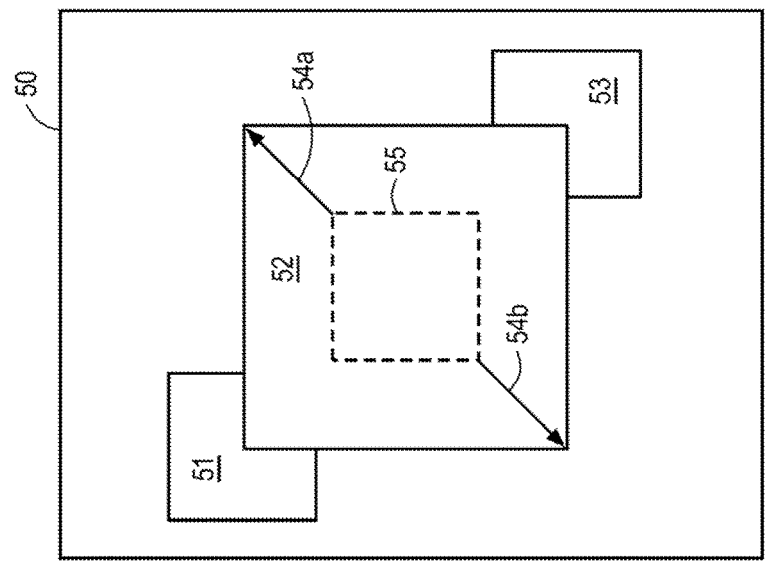
Figure 5A:
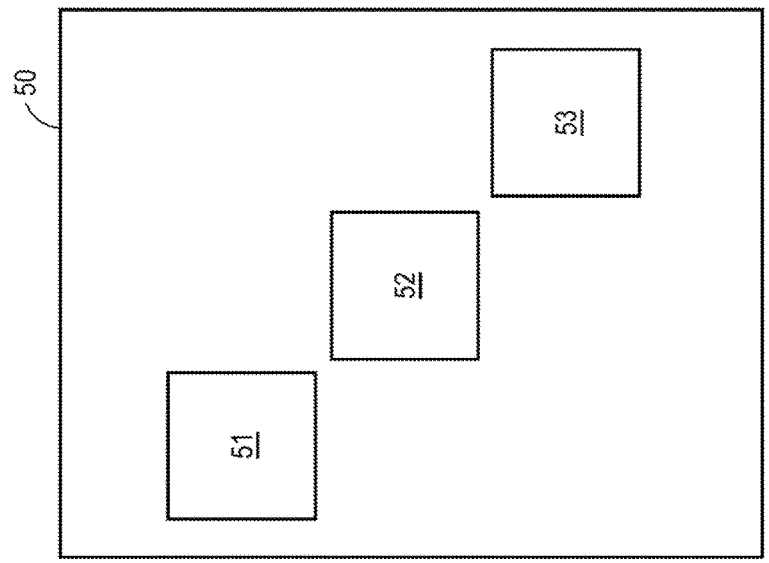
Figure 5C:
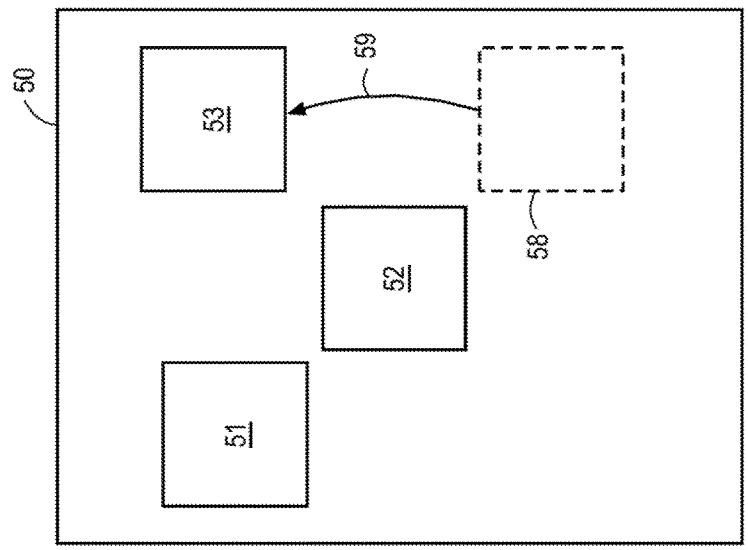

FIGS. 5A-5F illustrate an example sequence of screenshots showing manipulation of objects via gesture-based user input during a capture phase of functional testing a mobile application. FIG. 5A shows a graphical user interface window 50 of a touch-sensitive screen of a mobile device running a mobile application that displays three objects 51, 52 and 53 (i.e., squares) respectively shown from left-to-right and top-to-bottom on the screen. FIG. 5B shows GUI window 50 following a continuous, multi-touch gesture (e.g., zoom) made by a user on object 52. This gesture input is represented by arrows 54a and 54b which show the expansion of the square shape of object 52 from its previous shape/location (shown by dashed lines 55) to its larger square shape that now overlaps adjacent objects 51 and 53. FIG. 5C illustrates GUI window 50 following a squeeze or pinch gesture (represented by arrows 57a & 57b) made on object 52 that reduced the size of object 52 from its immediately preceding shape/location shown by dashed lines 56.

Figure 5D:
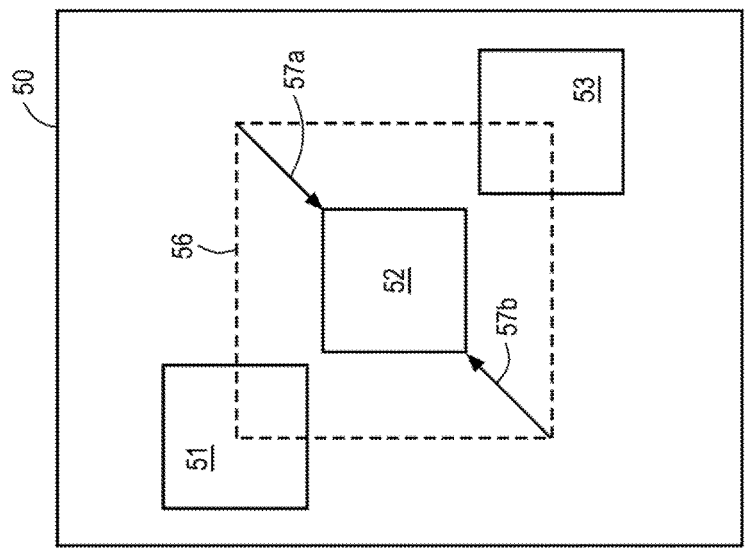

In FIG. 5D the user has selected object 53 via a tap or touch gesture and moved it to a new position in the upper right hand corner of GUI window 50 using a continuous touch sliding gesture shown by arrow 59. Note that when this gesture is performed on the mobile device, the TouchTest Driver captures the exact location coordinates and temporal speed of the gesture as it occurs on the screen. In this case, each of the positional coordinates of the arc shown by arrow 59 is captured and the information is sent back to the functional test program. The velocity of the movement (sampled in small increments of time) is also captured. For example, the user may begin to move object 53 slowly, and then increase the speed of his finger before stopping and releasing his finger from the touch screen. The functional test program not only captures the starting point (represented by dashed line 58) and end point of the gesture, but also the path taken (arrow 59) and the temporal speed that the gesture took place. For instance, the program may capture the gesture input as including an array of velocity vectors (e.g., each vector sampled every 100 milliseconds).

FIG. 5E illustrates the next gesture input or command in the sequence, which consists of the movement of object 51 from its previous position shown by dashed lines 60, to its new location at the bottom, left-hand position of GUI window 50. Arrow 61 shows the path that object 51 took as a result of the continuous touch gesture input of the user.

FIG. 5F shows a final continuous touch gesture input in the test sequence in which object 53 is moved from the location shown by dashed line 62 to a new location in the upper, left-hand corner of GUI window 50. In this case, object 53 travels a circuitous path represented by arrow 63, which reflects the continuous touch gesture input of the user. As discussed above, each coordinate point along the path shown by arrow 63 is captured and recorded by the functional testing program in response to the gesture-based user input. Additionally, the temporal speed along the path is recorded such that playback of the recorded test clip exactly and precisely reproduces the movement of object 53.

Figure 6:
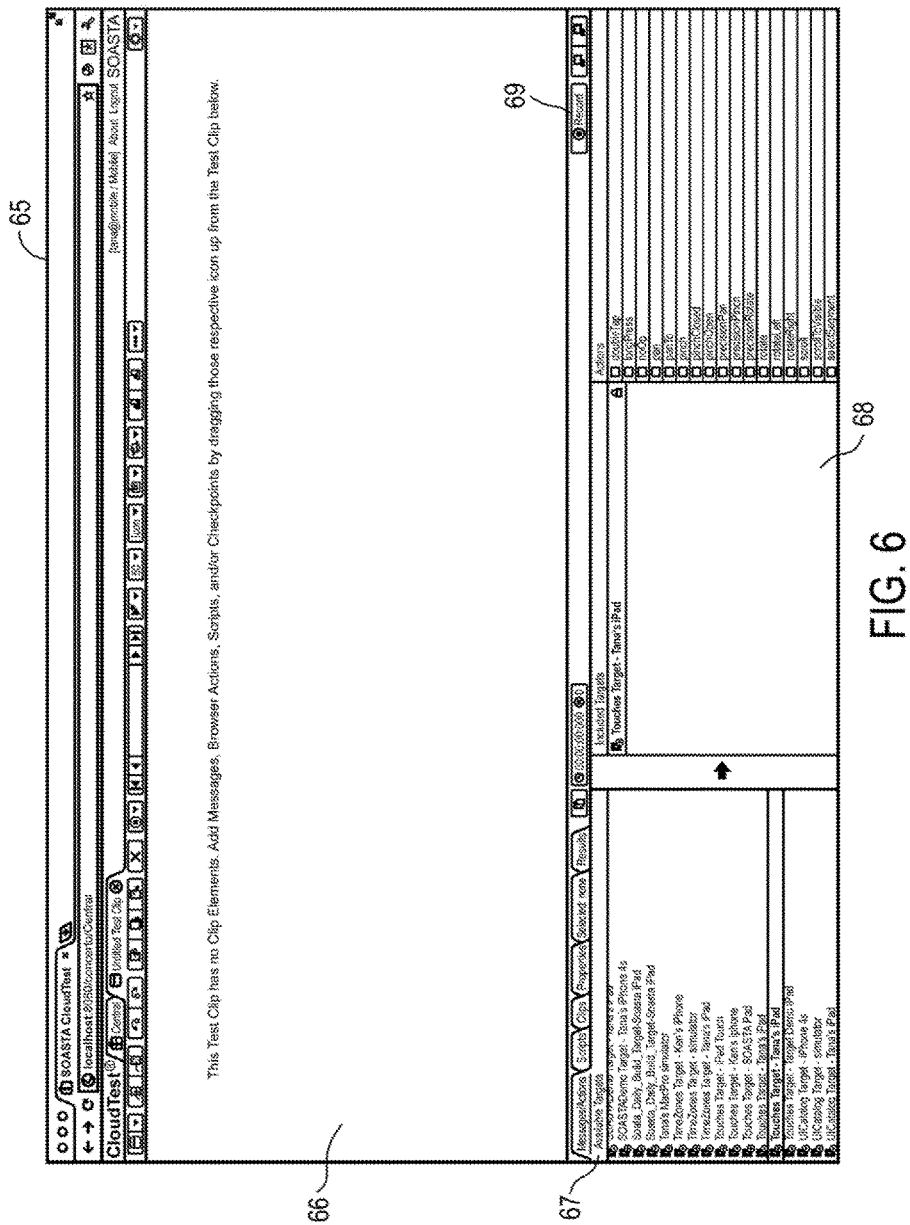
FIG. 6 is an example graphical user interface window that shows selection of a remote mobile computing device targeted for precision capture of gesture-based user input.

FIG. 6 is an example GUI window 65 that may be produced on the display screen of a user's computer (e.g., of laptop 13) immediately after logging into the cloud-based functional testing program. In this example, an untitled test clip tab or field shows an absence of messages or clip elements since recording has yet to begin. The user may initiate capture and recording of inputs made by another user on a selected target by clicking on or selecting "Record" button 69. A listing of available targets (pre-loaded with appropriate device agent software) is provided in tab 67 shown in the lower left-hand corner of window 65.

As shown, the target (mobile app+mobile device) selected by the user in this example is "Touches Target—Tana's iPad". Once selected, the Touches Target—Tana's iPad target appears or is moved into the list of included targets of field 68. It is appreciated that one or more targets may be selected for the test clip to be generated during the capture/recording process. Clicking on button 69 commences recording of all inputs to the "Target Touches" mobile application launched on "Tana's iPad" mobile computing device, wherever that mobile device is located (e.g., anywhere in the world via IP network connections). In other words, a first user working on laptop 13 may utilize GUI window 65 at a first geographic location to remotely select a target (defined as a mobile app and mobile device) at a second geographic location for capture/recording of all inputs made by a second user working on that mobile device.

Figure 7:
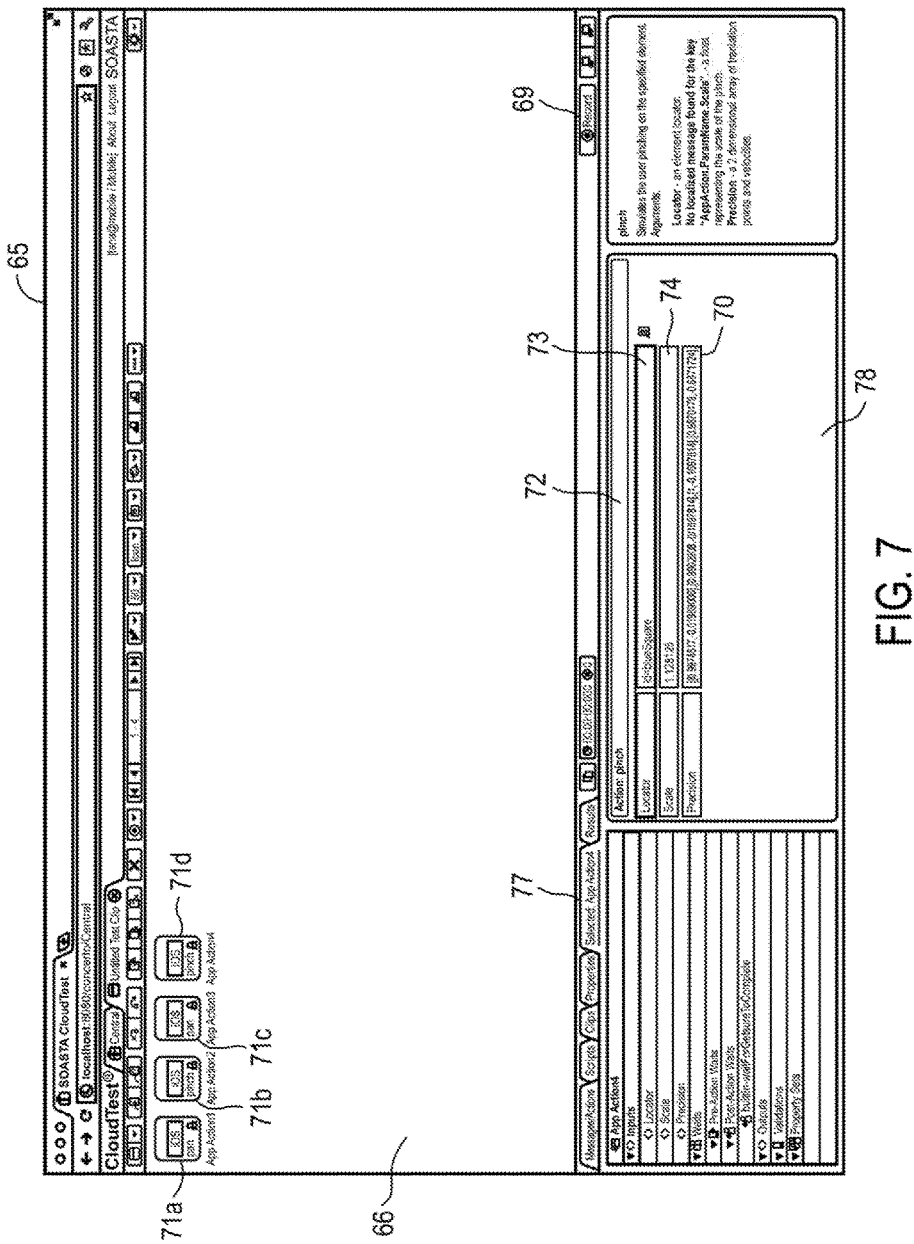
FIG. 7 is an example graphical user interface window that shows a test clip automatically created in response to the precision capture of gesture-based user input on a remote mobile computing device.

FIG. 7 illustrates GUI window 65 with a test clip automatically created in response to the precision capture of gesture-based user input on a remote mobile computing device. In this example, Record button 69 has already been clicked and four gesture-based inputs or actions (depicted as message/action icons 71a-71d) are shown recorded in test clip tab 66. Tab 77 shows App Action4 selected, corresponding to icon 71d in the test clip field 76. Note that tab 77 provides the user with a variety of selectable drop-down menu options, which include Pre-Action Waits, Post-Action Waits, Outputs, and Validations. Field 78 provides detailed information about the selected App Action4. In the embodiment shown, field 78 includes a descriptor field 72 indicating the type of gesture-based action (i.e., pinch) captured/recorded; an object locator field 73 (id=blueSquare); a scale field 74, and a precision data field 70. Field 70 contains an array of all of data (e.g., position coordinates, temporal speed, etc.) captured by the touch test component library from inside the mobile application response to the pinch action of the mobile device user.

Figure 8:
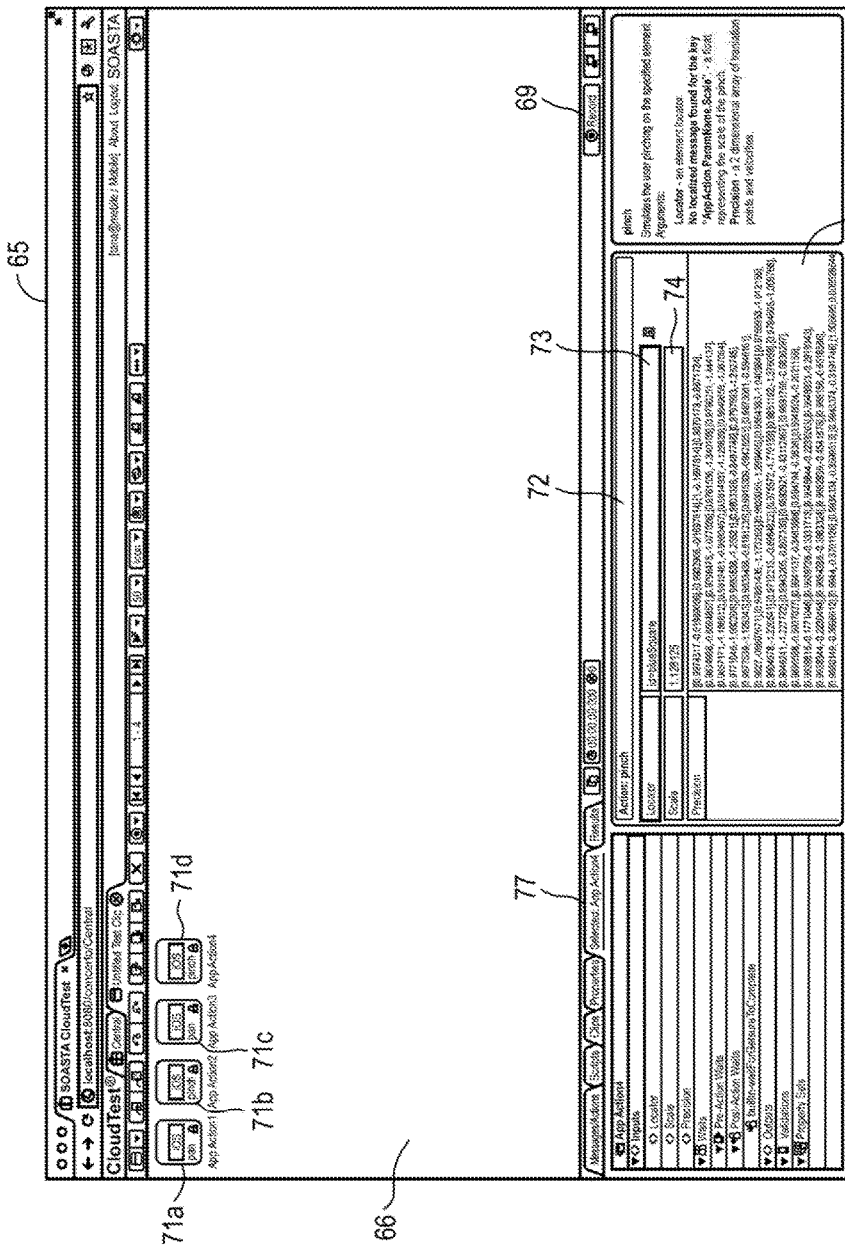
FIG. 8 is an example graphical user interface window that shows an array of data elements produced by the precision capture of a pinch-action gesture on a remote mobile computing device.

FIG. 8 illustrates GUI window 65 with precision data field 70 expanded to show all of the detailed data (e.g., coordinates captured/recorded over time) associated with the pinch gesture that corresponds to icon 71c in the test clip.

Figure 9:
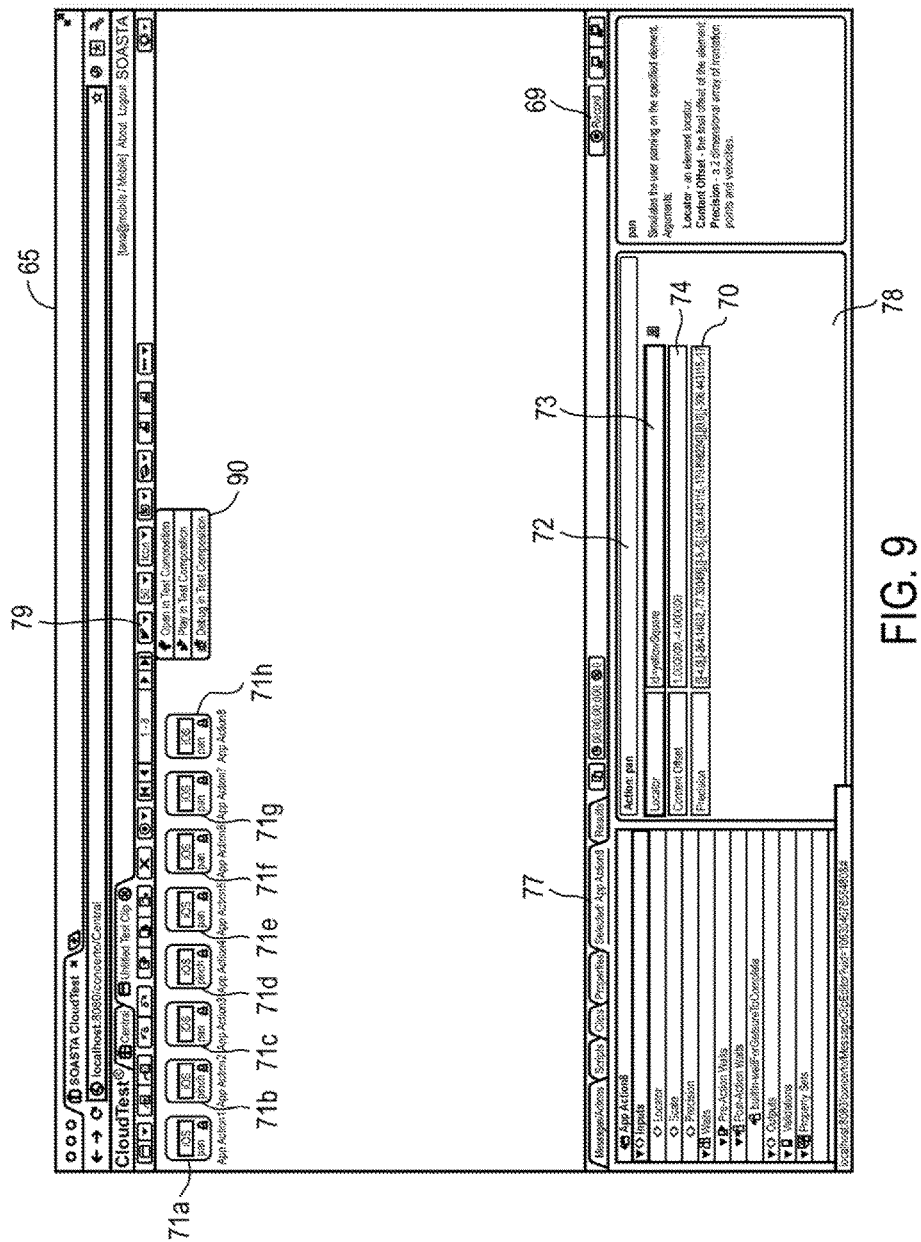
FIG. 9 is an example graphical user interface window that shows selection of a test clip for playback in a test composition.

FIG. 9 illustrates GUI window 65 with precision data field 70 after the capture/recording of additional gesture-based input actions 71e-71h. In this example, tabs 77 and 78 show selected App Action 8 associated with a pan gesture that corresponds to icon 71h in the test clip. Note also that command button 79 is shown clicked, resulting in a pull-down menu 90 of options from that the user may select. As shown, button 79 allows the user to open the recorded clip in a test composition, play the clip in a test composition, or debug the clip in a test composition (e.g., using a clip editor UI). By way of example, using the clip editor, a user may convert the scale of a pinch gesture from the precisely recorded value to a different value that may be more relevant to the test. The same is true with respect to any of the gesture-based inputs or other inputs precisely recorded.

As discussed, playback of a previously recorded test clip results in execution of all of the user input actions, exactly as they were precisely captured on the mobile device. That is, when a user incorporates the clip into a test composition and plays it back, all of the previously-recorded actions will be played back on the target at exactly the same speed and exactly the same positions as when the user was exercising the mobile app during the capture/recording phase. Note that the user of the functional testing program also has the option of adding delays, waits, or otherwise modifying or changing the sequence of actions for playback in the test composition.

Upon completion of all functional testing, the mobile application may be submitted to a commercial app store, using a separate build target that does not include the testing component library, TouchTest Driver.

Private Device Cloud

In addition to performance and functional testing of mobile applications on various mobile platforms, it is important that the tests accurately reflect the user environment, including web services calls from games or other apps as well as mobile browsers. In one embodiment, this is achieved by testing mobile devices and apps across worldwide geographies through the implementation of a private device cloud. The private device cloud comprises a plurality of mobile devices associated with a business organization or enterprise, which devices are distributed in different countries and/or continents. The cloud-based functional test program described herein may be utilized to playback a test composition on each of these devices (either individually in a serial manner, or simultaneously in parallel). Because these devices can be individually located in different parts of the world, the private device cloud may be utilized to ensure that mobile apps perform as intended in different countries, on different device platforms, and over different Internet backbones and communication service providers. That is, the private device cloud may be employed to ensure mobile apps deliver on business promises, with accurate and repeatable tests that incorporate how real users are affected by dynamic mobile network conditions. This ensures that the mobile application performs consistently and reliably across the entire infrastructure (worldwide).

Figure 10:
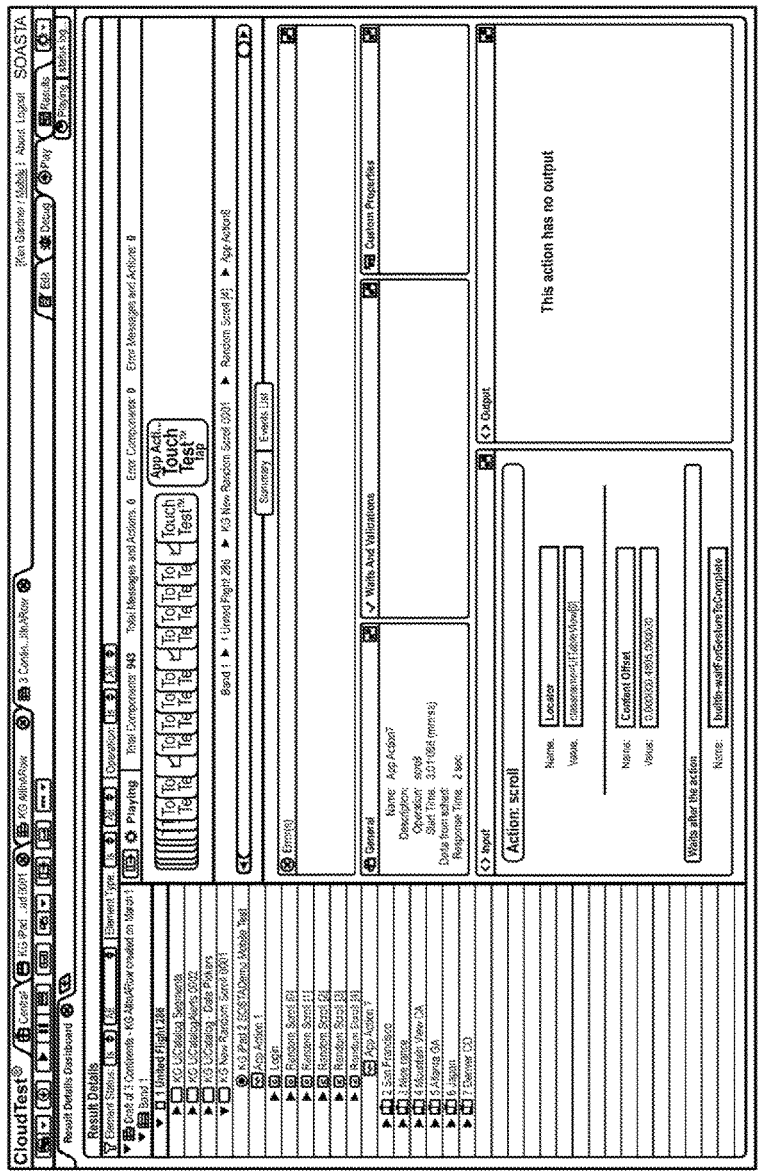
FIG. 10 is an example graphical user interface window that shows playback of a test composition on multiple devices throughout the world via a private device cloud.

By way of example, FIG. 10 is a graphical user interface window 100 that shows an actual demonstration of a test composition being played on multiple devices throughout the world via a private device cloud. As shown, the test composition is being played on seven different mobile devices running the same mobile application, with the seven mobile devices being distributed across three continents. That is, the actual physical mobile devices on which the app actions of the test composition are playing are located in San Francisco, Calif., Nice, France, Mountain View, Calif., Atlanta, Ga., Japan, and Denver, Colo. Note further that this real-world demonstration is itself being orchestrated from a mobile device (KG iPad) that is located in a commercial airplane currently in flight (United Flight 286).

Persons of skill in the art will appreciate that the concept of a private device cloud leverages the cloud computing paradigm, but with real devices. That is, without tethering, the employees of an organization or enterprise company who are located around the world can use their own mobile devices (e.g., iPhone, iPad, Android-based devices, etc.), including employees' existing devices, to create a private test network for testing mobile applications. A private device cloud for functional test automation of mobile applications thus provides a low-cost way of using the devices a business organization already owns to test end-user experience from real devices distributed around the world. Distributed devices communicate with their server via HTTP(S), thereby obviating the need for tethering or jailbreaking, and allowing real mobile devices located anywhere in the world to be used in a functional test of a mobile application.

Test results generated from the playback of the test composition on each of the mobile communication devices may be communicated back to the server or other computing device from each of the mobile computing devices via standard communications protocol such as HTTP or HTTPS. Aggregated and correlated test results may be delivered back to a user or testing team in a single analytics dashboard UI. In other words, the cloud-based functional test program described herein aggregates and/or correlates all mobile applications metrics—end-user experience, network performance, bandwidth, application and system metrics—in a single graphical view provided on a dashboard screen of a user's laptop, mobile computing device, or desktop computer. The view, provided on a GUI, may include the effects of load and network constraints on the actual end-user mobile devices.

In an alternative embodiment, a private device cloud comprising a plurality of mobile devices distributed around the world may be provided to an organization or enterprise by a third party.

Figure 11:
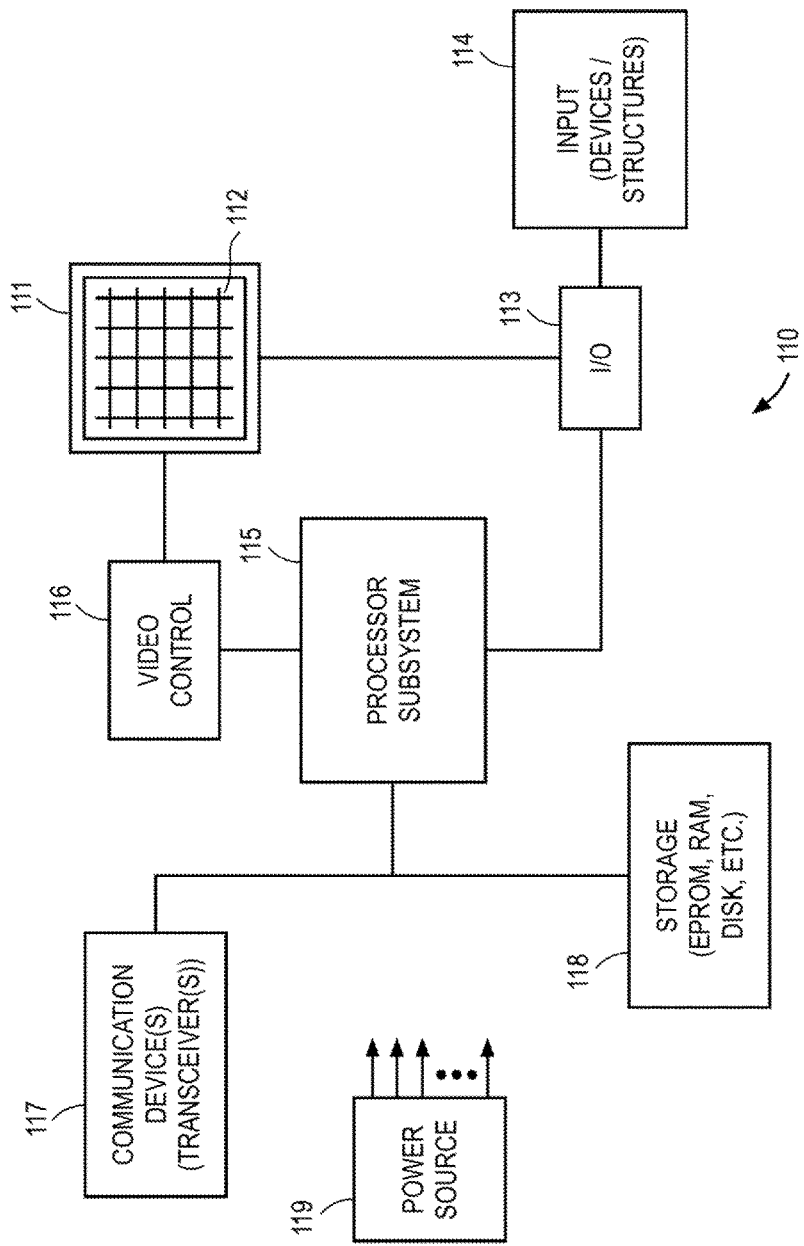
FIG. 11 is a generalized circuit schematic block diagram of an electronic computing device.

FIG. 11 is a generalized circuit schematic block diagram of a mobile computing device 110, which may comprise any of the computers, handheld computing devices, or other types of electronic processing devices, as described herein. Mobile computing device 110 typically comprises a number of basic subsystems, each of which is powered by a power source 119 (e.g., a battery), including a processor subsystem 115, a memory or storage 111 and an input/output (I/O) subsystem 113. Data may be transferred between storage 118 and processor subsystem 115, and between processor subsystem 115 and I/O subsystem 113, over dedicated buses, other bus structures, or via direct connection. An input subsystem 114 comprises various input devices/structures configured to control one or more device functions when pressed or otherwise actuated. The input structures may include a keypad, buttons, switches, etc., for entering input or controlling various modes of operation (e.g., sound, power, communication, or other settings). In certain implementations, input subsystem 114 may be used to navigate through the GUI (provided via display screen 101) that allows a user to interact with computing device 111. A touch-screen interface 112 associated with display screen 111 may also be used to receive user input, such as any of the variety of gesture-based user inputs described previously. A video controller 116 is configured to receive data and commands from processor subsystem 115 for controlling display screen 111. A communication subsystem 117 includes interfaces for one or more devices, such as one or more transceivers, for communicating with short-range (e.g., Bluetooth) and/or long-range communication networks. For example, communication subsystem 117 may include a wireless local area network (WLAN) interface (e.g., an IEEE 802.11x wireless network). As appreciated by persons of skill in the art, device 111 may utilize one or more communication protocols (e.g., HTTP or HTTPS) for data transmissions over a variety of networks.

Automated Device Cloud Provisioning

Figure 12:
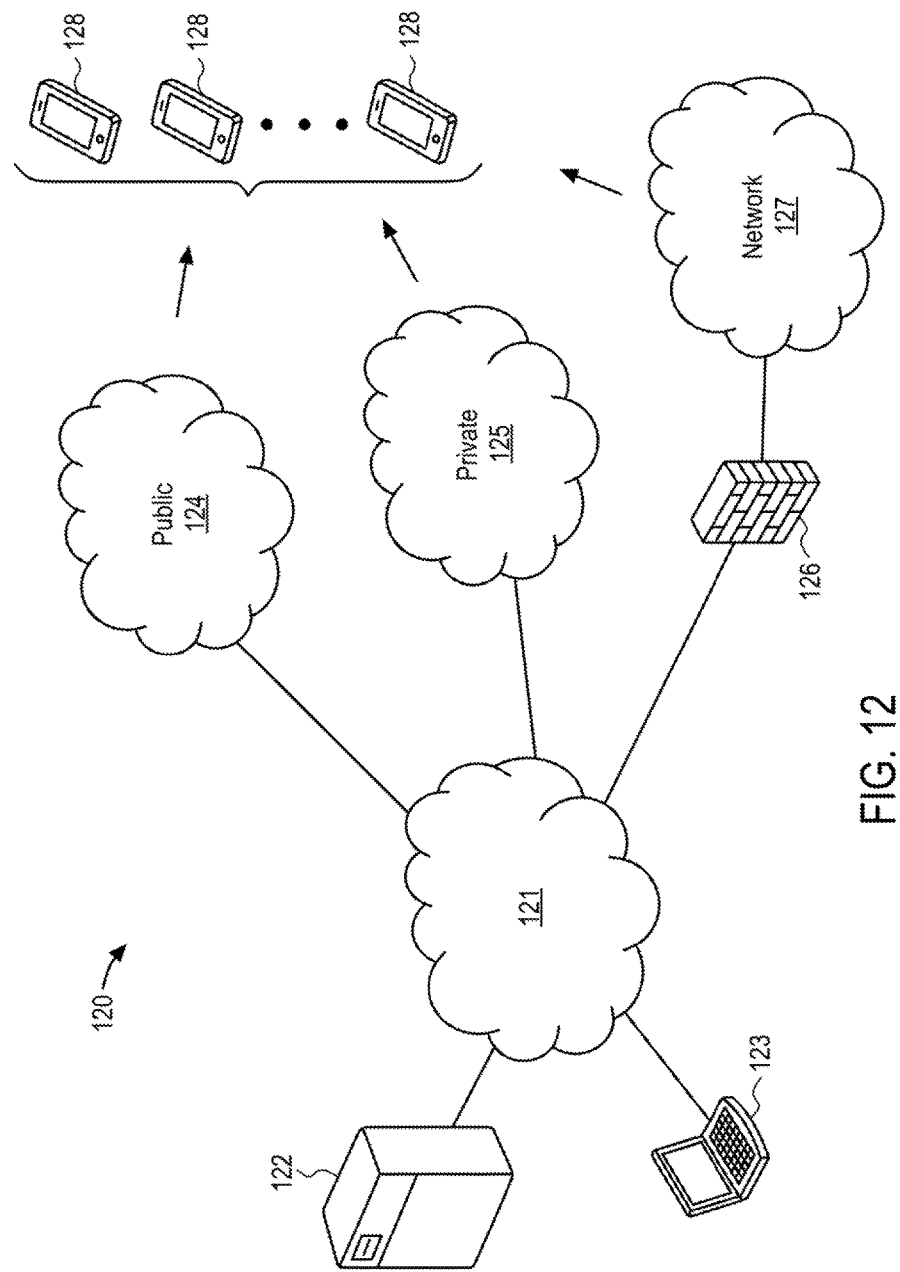
FIG. 12 is an example high level architectural diagram of a multi-cloud device grid computing platform providing functional test automation for mobile applications.

FIG. 12 is an example high level architectural diagram of a multi-cloud device grid computing system 120 providing functional test automation for mobile applications. As shown, a laptop computer 123 is connected to Internet Protocol (IP) cloud 121. Laptop computer 123 is associated with a user who may orchestrate deployment of a device grid, running of one or more test cases (i.e., test compositions) on the real devices 128 provisioned on the device grid, and termination of testing, including release of the devices.

In the example shown, server 122 communicates via cloud 121 with a browser application that provides a user interface running on laptop 123. In operation, server 122 executes a coded sequence of computer executed steps that allocates the mobile devices 128 across one or more device clouds required for the testing. In the example of FIG. 12 a public device cloud 124 and a private device cloud 125 are both shown connected to cloud 121 for communication with server 122. Also shown is a private network 127 connected to cloud 121 through firewall 126. In the example shown, network 127 is an on-premises network associated with the user's enterprise or business, which allows user's own devices to be included in the device grid.

It is appreciated that multiple different device cloud providers or vendors may be accessed through each of clouds 124 and 125, which each vendor providing a set of one or more mobile devices 128 having device characteristics specified by the user for a particular device grid definition. The idea is to automatically allocate and deploy a set of devices having specific characteristics across a particular group of device cloud vendors, and possibly also on-premises device models, for a particular test. The same application program that automatically allocates/verifies the specified mobile devices 128 may also verify that the allocated devices 128 are operational to conduct functional testing. In addition, following allocation and verification, in one embodiment the program may automatically execute the test (or multiple tests simultaneously), and release the devices after testing has terminated.

Figure 13:
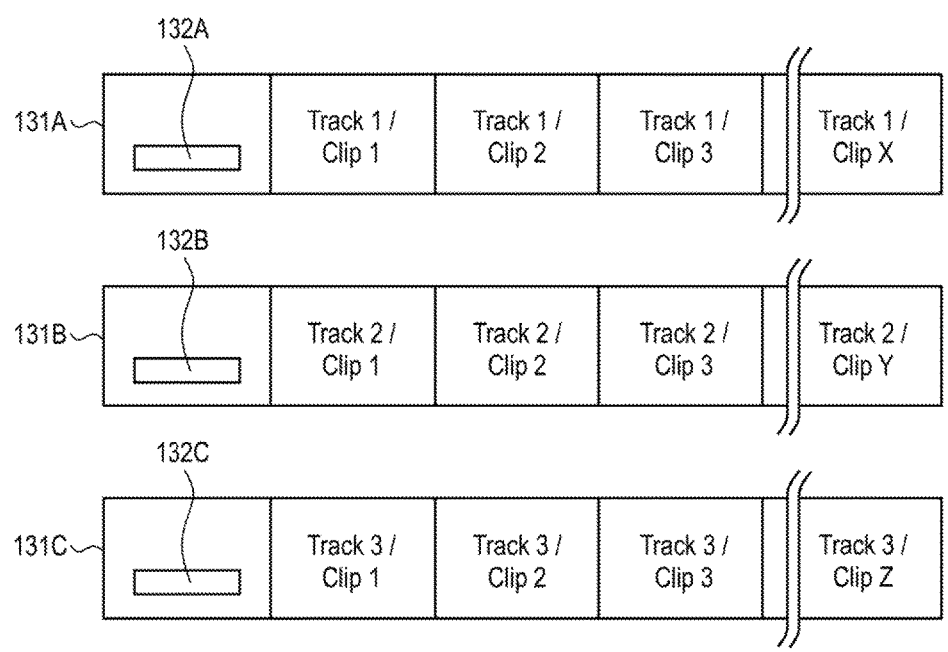
FIG. 13 illustrates a set of test composition tracks provided in a user interface for defining and editing functional tests for mobile applications running on a specified device grid.

FIG. 13 illustrates a set of test compositions 131A (Track 1), 131B (Track 2), and 131C (Track 3) provided in a user interface (UI) for defining and editing functional tests of mobile applications running on a specified device grid. Each of the tracks includes a timed sequence of messages which comprise a test composition, also known as a test case. In one embodiment, the application program running on server 122 operates to create the UI shown in FIG. 13 that allows a user of laptop 123 to define and edit each test case. In one embodiment, an icon or button 132 is included at the start of each test composition track. For instance, button 132A appears at the start of test composition 131A; button 132B appears at the start of test composition 131B; and button 132C is at the start of test composition 131C. Clicking on each button 132 opens a new UI window (or drop-down menu) that allows a user or customer to define a device grid for that test case. Alternatively, the user or customer may select a previously-defined grid definition which has been saved/stored as a device grid object. In this manner, the device grid provisioning is merged into the test definitions available to the user from the test composition editor.

In an alternative embodiment, the device grid object is defined by a user from a device grid UI and then tied into a particular test composition, or vice-versa.

Figure 14:
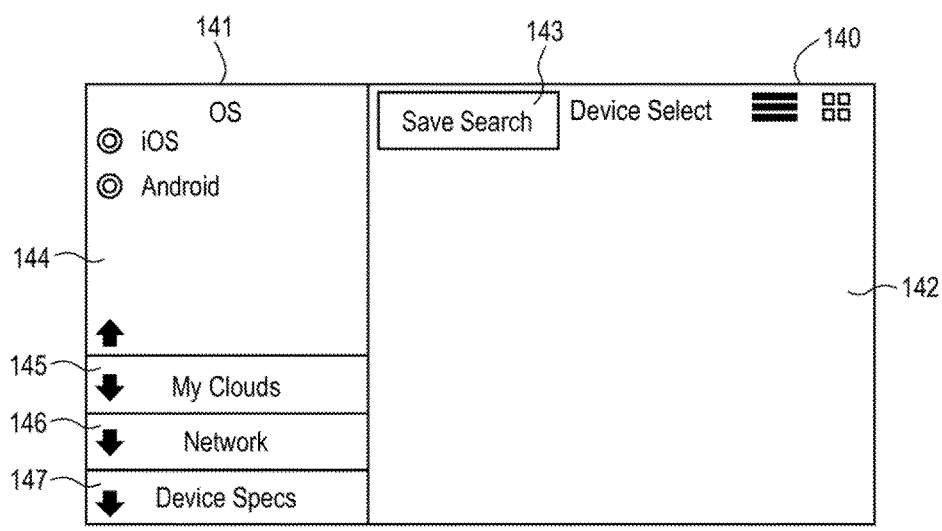
FIG. 14 is an example graphical user interface window that provides a user with the ability to specify the search criteria for provisioning a multi-cloud device grid.

FIG. 14 is an example graphical user interface window 140 that provides a user with the ability to specify the search criteria for provisioning a multi-cloud device grid. In one embodiment, window 140 opens in a browser application running on the user's laptop in response to the user clicking on button 132 from the test editor UI shown in FIG. 13. The device grid UI shown in window 140 includes a search criteria panel 141 and a search results field 142. Note that in the example of FIG. 14, search results field 142 is shown empty, as the user has yet to specify the search criteria from panel 141. Search panel 141 includes an operating system (OS) field 144, a device cloud field 145, a network field 146, and a device specification field 147. In other embodiments, fewer or more search criteria fields may be provided. Using the fields provided in search criteria panel 141 allows the user to specify the characteristics of the devices they want for a particular device grid. That is, the device grid UI shown in window 140 provides the user with the ability to specify a fine level of control (if desired) over what types of devices and their specific characteristics they want for a particular functional test composition.

Note that search results field 142 includes a "Save Search" icon or button 143. Once a user has selected the device characteristics using search criteria panel 141, the search results appearing in search results field 142 may be saved to a memory storage location. The memory storage location may be local to the user's laptop 123, server 122, or other accessible database.

Figure 15:
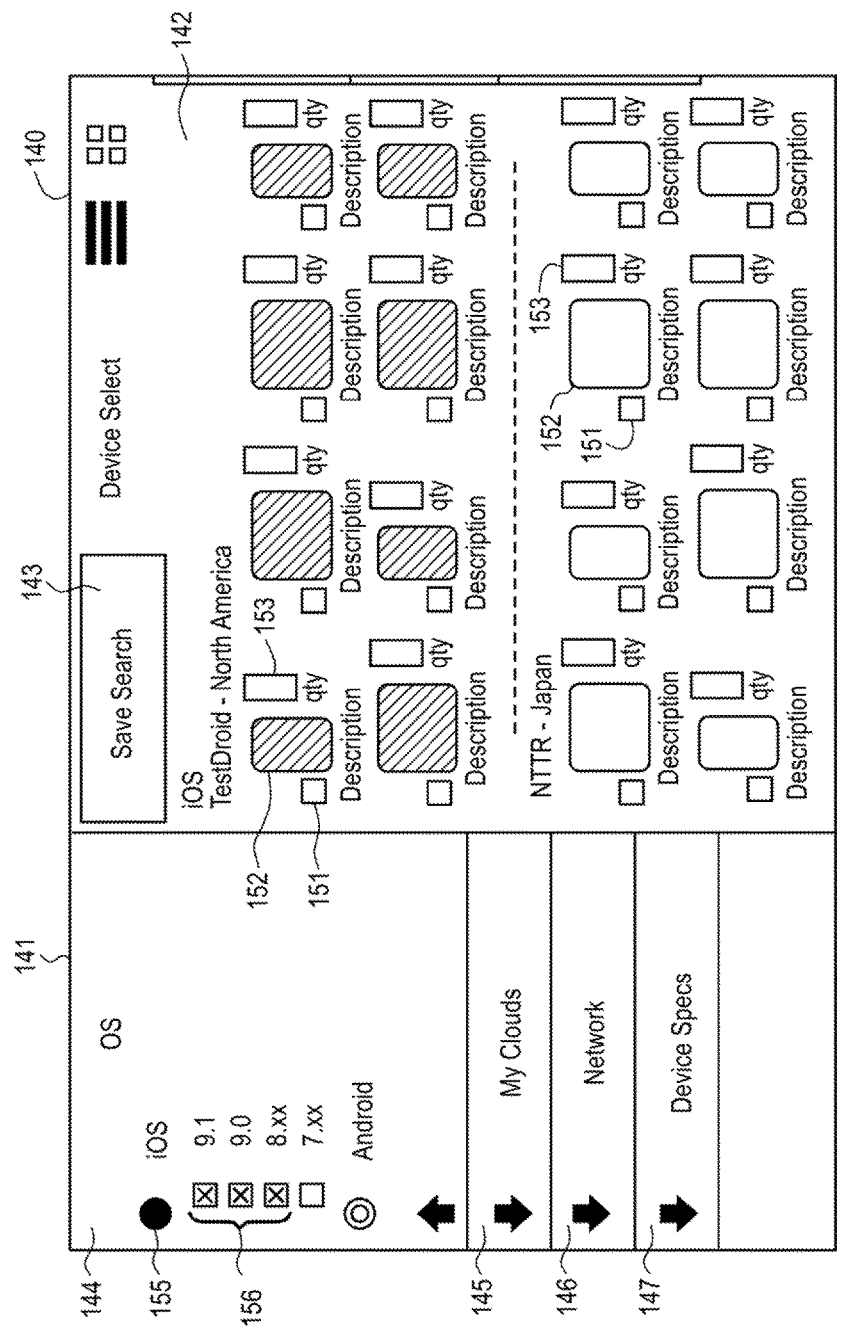
FIG. 15 illustrates the example search criteria panel of FIG. 14 showing search results after selection of specific device type models.

FIG. 15 illustrates the search criteria panel of the UI shown in FIG. 14 with search results field 142 populated with devices that match the selection of specific device type models input by the user. As shown, in OS field 144 of search criteria panel 141 the user has selected iOS button 155 and checked boxes 156 to select smartphone device models that run three different operating systems (i.e., iPhone models running OS 9.1, 9.0, and 8.xx) as the OS input. It is appreciated that a wide variety of mobile devices (smartphones, tablets, handheld, wearable, etc.) of different manufacturers, and running different OS versions, may be included in search criteria panel 141.

In one embodiment, the user may select either Android or iOS operating system as a required input. All other inputs, e.g., in fields 145, 146 and 147, are optional. Without specific user selection input, the My Clouds field 145, Network field 146, and Device Spec field 147 default to ALL, meaning that all cloud venders, all networks, and all device specifications are selected. In other words, the user may be as specific or general with respect to selection of desired mobile device characteristics for the functional testing. Examples of optional search criteria include device cloud provider (e.g., Testdroid, Amazon device farm, NTTR, etc.); vendor or manufacturer (e.g., Samsung, HTC, Google, etc.); model (e.g., iPhone, iPad, etc.), as well as other specific device characteristics (e.g., size, memory capacity, or other criteria).

Continuing with the example of FIG. 15, in response to the user selecting button 155 and checking boxes 156, the system automatically goes out to the device clouds that the user has established accounts with (or accounts that a third party service provider has accounts with) and finds devices that match the user selected filter criteria. Hence, FIG. 15 shows search results field 142 populated with a plurality of device entries that match the selected OS versions made in OS field 144. One entry is shown for each matching device. In the embodiment shown, each entry includes a description field 152, a quantity field 153, and a selection box 151. Description field 152 may include text, an image of the actual device, or an icon. Note that this example, the search results are shown organized or split into separate sections according to device cloud provider. For instance, available devices by cloud provider Testdroid—North America are shown on the top half of search results field 142, with devices provided by NTTR—Japan being shown on the bottom half.

In one implementation, the search results show specific model types. For example, if the user searched for iPhones, the search results may include an iPhone 6S, an iPhone 4, and an iPhone 6 Plus. Search results field 142 may also include manually-provisioned devices. For manually provisioned devices the UI may show the device agent name the user chose when they installed the TouchTest agent (e.g., Andy's iPad).

Once the search results have been displayed, the user may click the "Save Search" button 143 without selecting any devices. The search criteria will be saved to memory. Alternatively, the user may select one or more specific devices by clicking on (checking) box 151 and entering a number into quantity field 153 of each device selected. Clicking "Save Search" button 143 saves to memory both the search criteria and the specific devices selected.

Figure 16:
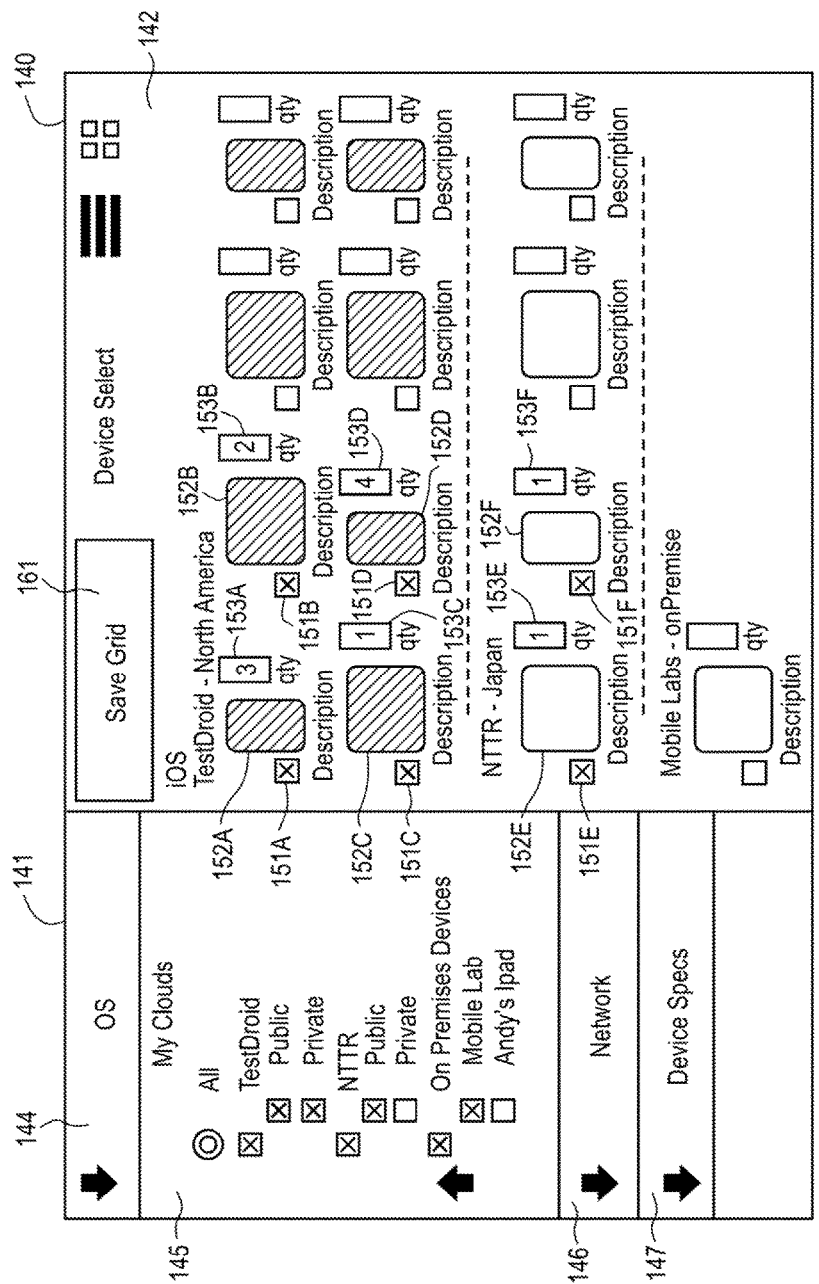
FIG. 16 illustrates the example search criteria panel of FIG. 15 showing selected devices from specified device cloud vendors.

FIG. 16 illustrates the search criteria panel of FIG. 15 showing selected wireless mobile communication devices from specified device cloud vendors. In this example the user has opened the My Clouds field 145 (by clicking on the left-hand side arrow) and selected various cloud provider accounts that they have previously setup, including any free range devices that are available to test. Cloud providers Testdroid (public and private clouds) and NTTR (public cloud only) are shown selected. As discussed previously, a public cloud account may provide access to off-the-shelf devices that may be used at other times by other people. A private cloud account may provide the user with devices reserved around-the-clock (24/7) only for that user. Also shown in the filter criteria of field 145 is the selection of On Premises Devices—Mobile Lab, which may include devices owned by the user or business enterprise which are available on the company's private network (e.g., network 127 of FIG. 1).

Responsive to the filter selections input in My Clouds field 145 the system automatically displays all of the devices that meet the filter criteria. Note that the search results displayed are inclusive of the input selections for all fields 144-147 in search criteria panel 141. At this point the user may select the actual devices and quantity of each device to be included in the device grid definition. That is, the UI allows the user to select specific devices as well as see the available quantity and set the desired quantity (less than or equal to the available quantity) of a particular device.

In the example of FIG. 16, the user has selected device 152A by checking box 151A and setting the quantity at 3 in field 153A; device 152b by checking box 151b and setting the quantity at 2 in field 153B; device 152C, checking box 151C with the quantity set at 1 in field 153C; device 152D, checking box 151D, quantity set at 4 in field 153D; device 152E, checking box 151E with the quantity set at 1 in field 153E; and device 152F, checking box 151F, quantity set at 1 in field 153F. Thus, in this example a total of 12 devices are shown selected for the device grid. In the embodiment shown, clicking on or selecting "Save Grid" button 161 saves the device selection to a memory storage location as a device grid object.

Persons of skill in the art will appreciate that a saved device grid object created in the manner described above can be retrieved for any functional test them may wish to run. A user or customer may thus generate a library of different device grid objects for different testing scenarios. Alternatively, they can simply use the same device grid object, for any further test. Note that the device grid may consist of a homogenous collection of mobile devices allocated from a single device cloud provider; or a variety of different devices having different characteristics selected across different device cloud providers.

Figure 17:
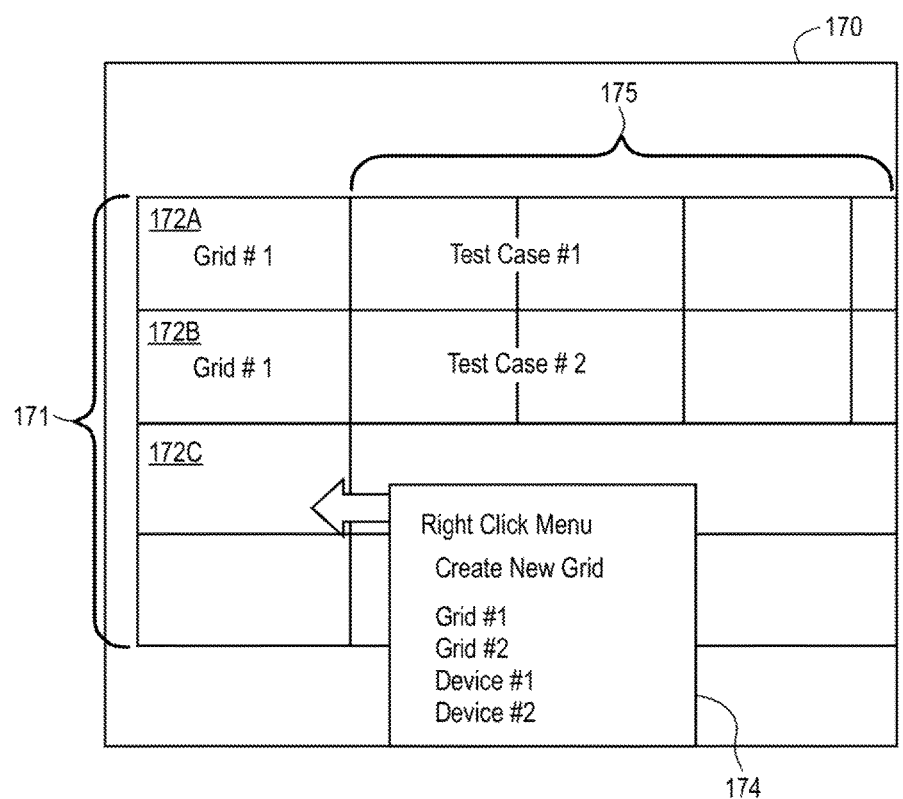
FIG. 17 is an example graphical user interface window that shows a device grid definition selected for use with more than one test case run simultaneously.

FIG. 17 is an example graphical user interface window 170 that shows a device grid definition selected for use with two different test cases 175 (Test Case #1 and Test Case #2) that will run simultaneously. In one embodiment, the UI provided in window 170 may part of the test composition editor UI. In the test composition editor the track-level selector is enhanced to include a list of available device grids. Individual devices may also be selected for functional testing using a predefined test case or composition. By way of example, field 172A at the beginning of the top track, which is designated Test Case #1, indicates that device grid #1 has been selected for use with this test case. Similarly, field 172B also indicates the use of device grid #1 for Test Case #2. To designate a specific device grid for another track in the composition editor the user may right-click on field 172C, which results in drop-down menu 174 being displayed. Using menu 174, the user may scroll down and any of the options listed in the menu. For instance, the user may choose to define a new device grid (as discussed previously), select an existing device grid (e.g., Grid #1 or Grid #2), or select a specific, manually-provisioned device agent (e.g., Device #1 or Device #2). Selecting the "Create New Grid" option brings up the TouchTest Grid UI described in conjunction with FIGS. 14-16.

In a specific implementation, if the user selects a specific device grid, an "Auto-Deploy" option is presented to the user. With the "Auto-Deploy" option selected, when the functional test begins, the system automatically provision and deploy the specified device grid in one or more device clouds/private networks. When the test finishes, the system automatically terminates that grid, thereby releasing all devices. Another option available to the user is to provision and deploy all of the devices specified in the device grid, and then keep the grid up and running through a series of back-to-back functional tests. In other words, the device grid stays up and running until all functional tests are completed. At that point the device grid may be terminated and the devices released, either automatically after the last test completes, or shutdown manually.

Persons of skill in the art will appreciate that track-level drop-down menus need not be used to select or specify a device grid. The device grid for a particular functional test may be specified through another user interface, e.g., the TouchTest UI. Is should also be understood that in the case where more than one test case is run simultaneously, as shown in the example of FIG. 17, the number of devices selected is multiplied. For instance if Grid #1 consists of 14 selected mobile devices, then specifying the use of Grid #1 for a second test case means that a total of 24 mobile devices would be provisioned to run both test cases simultaneously.

Figure 18:
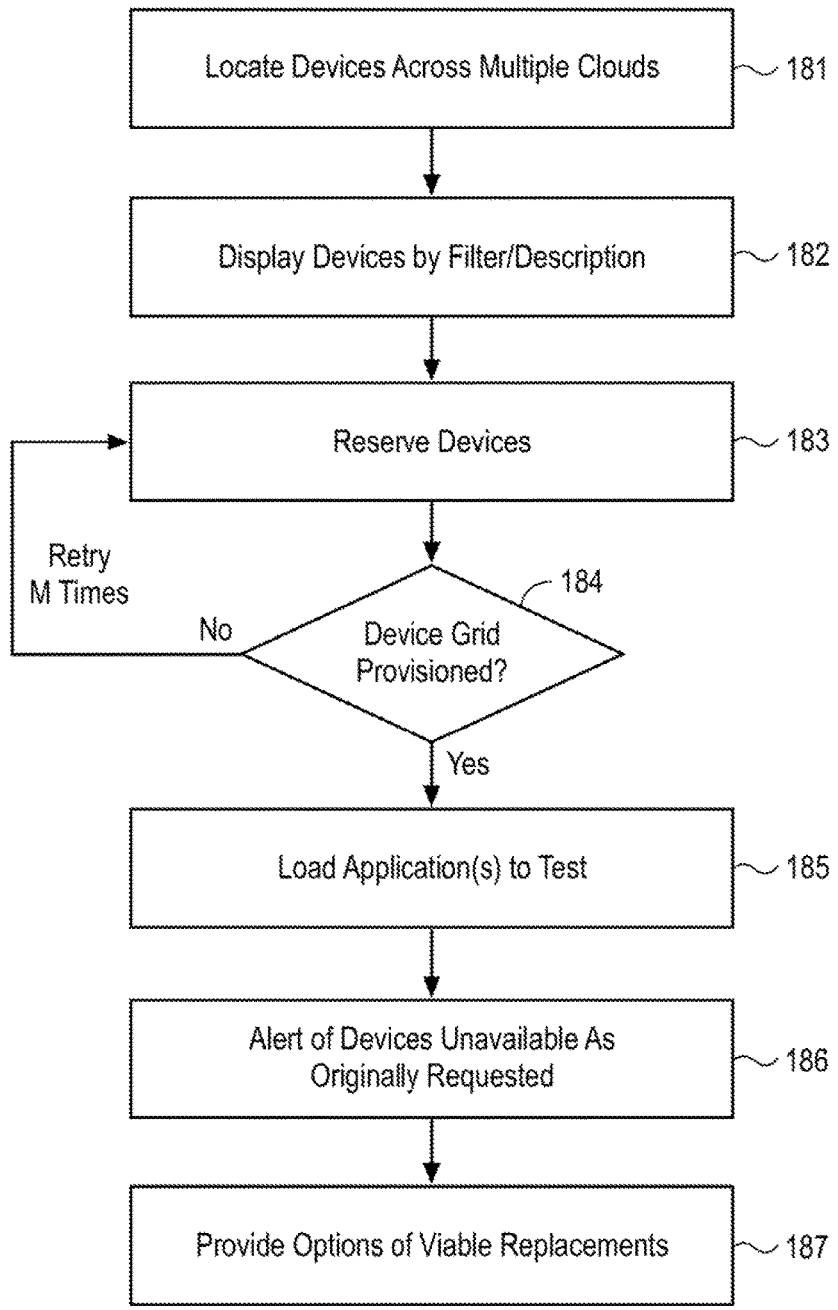
FIG. 18 is an example flow diagram of an automated sequence of steps for provisioning a device test grid.

FIG. 18 is an example flow diagram of an automated sequence of steps for provisioning a device test grid. The example method begins at block 181 with the locating or finding of actual physical devices in one or more device clouds that match the desired search criteria. The search may be initiated automatically from the UI in response to a user selecting any one of a number of different filter criteria. Each time the user selects an additional filter criteria, the search is automatically refined. When physical devices are located in the device cloud(s) they are displayed on the UI by filter/description. (Block 182) A variety of display options may be utilized. For example, the devices may be color coded by device cloud provider, model type, version, size, etc. The devices may also be organized on the display screen by device cloud provider, e.g., Testdroid, NTTR, etc.

At block 183 the devices are reserved in response to the user selecting one or more of the matching mobile devices displayed. For instance, the user may check a box adjacent to an icon or description of a particular device being displayed and input a number that sets how many of that particular device should be reserved. Note that the UI may run on a browser of a computer that communicates with a system server or other computer that communicates with the device cloud providers to find devices that match the user's search criteria, and then reserve those devices selected for use in functional testing. With each successive selection by the user of a particular device, and quantity of that device, to be reserved, the system program runs a query to check that all of the physical devices are reserved and provisioned for use in the device grid. (Block 184) If communications indicate that any of the selected devices are not properly provisioned, the system may retry (up to M times, where M is a predetermined integer) the provisioning through repeated communications with the device cloud provider(s).

Continuing with the example of FIG. 18, after the device grid has been provisioned the mobile application that is to be functionally tested is loaded onto each of the devices in the grid. (Block 185) In the event that some of the devices selected by the user are unavailable, the automated program may optionally alert the user of that fact via an audio message and/or text message displayed on the UI screen. (Block 186) The system program may also be configured perform an additional search to locate devices that closely match the unavailable device(s) and inform the user of those viable replacement devices. (Block 187)

Note that in certain embodiments, the automatic provisioning process described above may be initiated after the user has made all device selections and then clicked on a "Provision" or "Deploy" button. This results in the device grid being provisions and ready for test execution, i.e., "Run" command. As previously described, another option that may be provided to the user is an "Auto-Deploy-Run" button that automatically provisions the device grid(s) and then immediately begins running the functional test composition(s). In the event that multiple test cases are run, additional steps may be taken to properly synchronize playback of the multiple test tracks. During execution or playback, the devices may be monitored for any failures that might occur. Based on user-defined preference settings, functional testing may either be halted or continued in response to a device failure. A device failure limit may also be set; that is, the preference may only stop the test if the number of failures exceeds a predetermined number of devices.

After testing is completed, the devices may be released either automatically by the system program, or manually in response to additional user input to the UI. Another option is to automatically release the devices after a specified time duration, e.g., 2 hours.

It should be understood that elements of the disclosed subject matter may also be provided as a computer program product which may include a machine-readable medium having stored thereon instructions which may be used to program a computer (e.g., a processor or other electronic device) to perform a sequence of operations, such as those described above. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
   providing a graphical user interface (GUI) that allows a user to automatically provision a device grid for use in cloud-based functional testing of a mobile application, the GUI being provided in a window that includes a search criteria panel and a search results field, the search criteria panel including one or more fields that allows the user to specify a set of characteristics of mobile devices to be used in a particular device grid;
   sending, by the GUI, instructions to one or more device cloud providers to search for available mobile devices that match at least one of the characteristics;
   populating the search results field of the window with the available mobile devices that match the at least one of the characteristics;
   responsive to selection input of the user, provisioning the particular device grid by reserving with the one or more device cloud providers a number of mobile devices selected in the search results field;
   loading the mobile application to be functionally tested on each of the reserved mobile devices; and
   running a functional test composition of the mobile application simultaneously on each mobile device of the particular device grid, the functional test composition comprising a timed sequence of clips on the mobile devices running the mobile application, the timed sequence of clips including one or more messages each of which instructs a gesture-based action applied to at least one object displayed on the touch-sensitive display screen, each gesture-based action including the precision elements of a previously captured gesture-based user input stored in the memory, each gesture-based action corresponding to a functional aspect of the mobile application.

2. The computer-implemented method of claim 1 wherein the sending of the instructions to the one or more device cloud providers occurs responsive to the input search criteria.

3. The computer-implemented method of claim 1 further comprising saving the selection input in a memory as a device grid object.

4. The computer-implemented method of claim 1 wherein the loading of the mobile application occurs automatically responsive to a command input of the user.

5. The computer-implemented method of claim 1 further comprising running a functional test composition of the mobile application simultaneously on each mobile device of the particular device grid.

6. The computer-implemented method of claim 1 further comprising automatically releasing each mobile device of the particular device grid upon completion of the functional test composition.

7. The computer-implemented method of claim 1 wherein the one or more device cloud providers include a public device cloud provider.

8. The computer-implemented method of claim 1 wherein the one or more device cloud providers include a private device cloud provider.

9. The computer-implemented method of claim 1 wherein the set of characteristics includes an operating system type.

10. The computer-implemented method of claim 1 wherein the set of characteristics includes a specified device cloud provider.

11. The computer-implemented method of claim 1 wherein the set of characteristics includes a specified network.

12. The computer-implemented method of claim 1 further comprising alerting, by the GUI, the user of unavailability of a selected mobile device.

13. The computer-implemented method of claim 12 further comprising providing the user with one or more replacement devices for the unavailable selected mobile device.

14. A non-transitory computer-readable storage medium encoded with computer instructions, which, when executed by one or more processors, operable to:
   provide a graphical user interface (GUI) that allows a user to automatically provision a device and for use in cloud-based functional testing of a mobile application, the GUI being provided in a window that includes a search criteria panel and a search results field, the search criteria panel including one or more fields that allows the user to specify a set of characteristics of mobile devices to be used in a particular device grid;
   send, by the GUI, instructions to one or more device cloud providers to search for available mobile devices that match at least one of the characteristics;
   populate the search results field of the window with the available mobile devices that match the at least one of the characteristics;
   responsive to selection input of the user, provision the particular device grid by reserving with the one or more device cloud providers a number of mobile devices selected in the search results field;
   load the mobile application to be functionally tested on each of the reserved mobile devices; and
   run a functional test composition of the mobile application simultaneously on each mobile device of the particular device grid, the functional test composition comprising a timed sequence of clips on the mobile devices running the mobile application, the timed sequence of clips including one or more messages each of which instructs a gesture-based action applied to at least one object displayed on the touch-sensitive display screen, each gesture-based action including the precision elements of a previously captured gesture-based user input stored in the memory, each gesture-based action corresponding to a functional aspect of the mobile application.

15. The non-transitory computer-readable storage medium of claim 14 wherein the sending of the instructions to the one or more device cloud providers occurs responsive to the input search criteria.

16. The non-transitory computer-readable storage medium of claim 14 wherein execution of the computer instructions is further operable to save the selection input in a memory as a device grid object.

17. The non-transitory computer-readable storage medium of claim 14 wherein the mobile application is loaded automatically responsive to a command input of the user.

18. The non-transitory computer-readable storage medium of claim 14 wherein execution of the computer instructions is further operable to run a functional test composition of the mobile application simultaneously on each mobile device of the particular device grid.

19. The non-transitory computer-readable storage medium of claim 14 wherein execution of the computer instructions is further operable to automatically release each mobile device of the particular device grid upon completion of the functional test composition.

20. The non-transitory computer-readable storage medium of claim 14 wherein the one or more device cloud providers include a public device cloud provider.

21. The non-transitory computer-readable storage medium of claim 14 wherein the one or more device cloud providers include a private device cloud provider.

22. The non-transitory computer-readable storage medium of claim 14 wherein the set of characteristics includes an operating system type.

23. The non-transitory computer-readable storage medium of claim 14 wherein the set of characteristics includes a specified device cloud provider.

24. The non-transitory computer-readable storage medium of claim 14 wherein the set of characteristics includes a specified network.

25. The non-transitory computer-readable storage medium of claim 14 wherein execution of the computer instructions is further operable to alert, by the GUI, the user of unavailability of a selected mobile device.

26. The non-transitory computer-readable storage medium of claim 25 wherein execution of the computer instructions is further operable to provide the user with one or more replacement devices for the unavailable selected mobile device.

* * * * *